United States Patent [19] [11] Patent Number: 5,924,068
Richard et al. [45] Date of Patent: Jul. 13, 1999

[54] ELECTRONIC NEWS RECEPTION APPARATUS THAT SELECTIVELY RETAINS SECTIONS AND SEARCHES BY KEYWORD OR INDEX FOR TEXT TO SPEECH CONVERSION

[75] Inventors: Ronald B. Richard, River Vale, N.J.; Kazue Hata, Santa Barbara, Calif.; Stephen Johnson, Erdenheim, Pa.; Steve D. Pearson, Santa Barbara, Calif.; Judson Hofmann, Hopewell, N.J.; Brian A. Hanson, Goleta, Calif.

[73] Assignee: Matsushita Electric Industrial Co. Ltd., Kadoma, Japan

[21] Appl. No.: 08/794,503

[22] Filed: Feb. 4, 1997

[51] Int. Cl.$^6$ ....................................................... G10L 5/02
[52] U.S. Cl. ............................... 704/260; 348/7; 345/901
[58] Field of Search ........................... 348/7, 2; 345/901, 345/978; 434/317; 704/260, 270

[56] References Cited

U.S. PATENT DOCUMENTS 4,124,773  11/1978  Elkins .
4,740,912   4/1988  Whitaker .

(List continued on next page.)

FOREIGN PATENT DOCUMENTS 2216319  10/1989  United Kingdom .

OTHER PUBLICATIONS

Computer Dictionary, Microsoft Press, Redmond, WA (1994), pp. 208, 209, 369.
"PostCard offers a veiw of electronic newspaper", Article from Baltimore Sun Newspaper, Jul. 26, 1993, p. 11C.
"Product gives PC user access to business news", Article from Baltimore Sun Newspaper, Jul. 26, 1993, p. 11C.
Letter from Information Highway Media Corporation, dated Nov. 2, 1995.
Merrilyn L. Gow, "Perceptual Evaluation of the Naturalness of Synthetic Speech", Speech Technology Laboratory, Research Reports, vol. 3, Sep. 1992, pp. 7–11.
Kenji Matsui et al., "Improving Naturalness in Text–to–Speech Synthesis Using Natural Glottal Source", Speech Technology Laboratory, Research Reports, vol. 3, Sep. 1992, pp. 21–27.
Yoko Hasegawa et al., "Fundamental Frequency as an Acoustic Cue to Accent Perception", Speech Technology Laboratory, Research Reports, vol. 3, Sep. 1992, pp. 83–92.

(List continued on next page.)

*Primary Examiner*—David R. Hudspeth
*Assistant Examiner*—Donald L. Storm
*Attorney, Agent, or Firm*—Ratner & Prestia

[57] ABSTRACT

An electronic news receiving device receives text data for an electronic edition of a newspaper in the evening and audibly reads the newspaper to the user the next day. The newsreader includes a receiver which receives an electronic edition of a newspaper transmitted by a transmitter at an electronic news preparer's facility. The news preparer may mark words that do not conform to conventional letter-to-sound rules with a pronunciation flag and provide pronunciation data for the words with the electronic edition of the newspaper. The data may be compressed by providing a dictionary in the news receiving device and, at the preparer's facility, translating each word into a dictionary address. The transmission channel may include a telephone line, the vertical blanking interval of a television signal, a cable television channel, an AM/FM subcarrier signal or a satellite channel. The received electronic edition of the newspaper is processed by a section filter to retain desired sections of the newspaper and to discard unwanted sections. The retained news articles are stored in memory. A text-to-speech converter produces an audible output corresponding to the spoken text of the news articles. A user can input one or more keywords to cause the device to selectively read articles containing the keywords. The text to speech converter of the device uses rules and a dictionary to provide syntactic and semantic prosody for morpheme reconstructions. The user may determine which articles are read and may vary the rate at which articles are read using manual controls or spoken commands.

32 Claims, 16 Drawing Sheets

U.S. PATENT DOCUMENTS

| | | |
|---|---|---|
| 4,789,863 | 12/1988 | Bush . |
| 4,812,843 | 3/1989 | Champion, III et al. . |
| 4,816,911 | 3/1989 | Kirsch et al. . |
| 4,845,658 | 7/1989 | Gifford . |
| 4,899,369 | 2/1990 | Kondziela . |
| 4,928,177 | 5/1990 | Martinez . |
| 4,954,958 | 9/1990 | Savage et al. . |
| 4,975,957 | 12/1990 | Ichikawa et al. . |
| 4,984,174 | 1/1991 | Yasunobu et al. . |
| 4,996,707 | 2/1991 | O'Malley et al. . |
| 5,006,849 | 4/1991 | Baarmam et al. . |
| 5,008,926 | 4/1991 | Misholi . |
| 5,020,143 | 5/1991 | Duckeck et al. . |
| 5,027,400 | 6/1991 | Baji et al. . |
| 5,040,212 | 8/1991 | Bethards . |
| 5,051,924 | 9/1991 | Bergeron et al. . |
| 5,056,145 | 10/1991 | Yamamoto et al. . |
| 5,091,931 | 2/1992 | Milewski . |
| 5,113,430 | 5/1992 | Richardson, Jr. et al. . |
| 5,130,792 | 7/1992 | Tindell et al. . |
| 5,131,020 | 7/1992 | Liebesny et al. . |
| 5,133,081 | 7/1992 | Mayo . |
| 5,168,353 | 12/1992 | Walker et al. . |
| 5,168,548 | 12/1992 | Kaufman et al. . |
| 5,182,555 | 1/1993 | Sumner . |
| 5,193,110 | 3/1993 | Jones et al. . |
| 5,195,128 | 3/1993 | Knitl . |
| 5,199,080 | 3/1993 | Kimura et al. . |
| 5,200,952 | 4/1993 | Bernstein et al. . |
| 5,204,905 | 4/1993 | Mitome . |
| 5,208,850 | 5/1993 | Kino . |
| 5,222,120 | 6/1993 | McLeod et al. . |
| 5,282,242 | 1/1994 | Hachinoda . |
| 5,283,833 | 2/1994 | Church et al. . |
| 5,283,887 | 2/1994 | Zachery . |
| 5,303,148 | 4/1994 | Mattson et al. . |
| 5,327,498 | 7/1994 | Hamon . |
| 5,335,276 | 8/1994 | Thompson et al. . |
| 5,339,156 | 8/1994 | Ishii . |
| 5,349,636 | 9/1994 | Irribarren . |
| 5,371,532 | 12/1994 | Gelman et al. . |
| 5,371,901 | 12/1994 | Reed et al. . |
| 5,377,303 | 12/1994 | Firman . |
| 5,384,893 | 1/1995 | Hutchins . |
| 5,661,635 | 8/1997 | Huffman et al. ........................ 361/684 |
| 5,689,648 | 11/1997 | Diaz et al. ............................... 705/26 |

OTHER PUBLICATIONS

Michael H. O'Malley, "Text–To–Speech Conversion Technology", Berkley Speech Technologies, IEEE, vol. 23, No. 8, Aug. 1990, pp. 17–23.

Yoshinori Sagisaka, "Speech Synthesis From Text", IEEE Communications Magazine, Jan. 1990, pp. 35–41.

John Makhoul and Richard Schwartz, "State of the Art in Continuous Speech Recognition", pp. 165–197.

Stephen E. Levinson, "Speech Recognition Technology: A Critique", pp. 159–163.

Biing–Hwang Juang et al., "Deployable Automatic Speech Recognition Systems: Advances and Challenges", AT&T Technical Journal, Mar./Apr. 1995, pp. 45–56.

Frederic Jelinek, "Training and Search Methods for Speech Recognition", pp. 199–214.

Lawrence R. Rabiner, "Toward Vision 2001: Voice and Audio Processing Considerations", AT&T Technical Journal, Mar./Apr. 1995, pp. 4–13.

Michael J. Cosky et al., "Talking to Machines Today and Tomorrow: Designing for the User", AT&T Technical Journal, Mar./Apr. 1995, pp. 81–91.

Hector R. Javkin et al., "A Multi–Lingual Text–To–Speech System", Speech Technology Laboratory, Research Reports, vol. 2, Nov. 1990, pp. 49–55.

Beatrix Zimmerman et al., "Sentence–Final Accents in Synthesized American English Speech", Speech Technology Laboratory, Research Reports, vol. 2, Nov. 1990, pp. 145–147.

ELECTRONIC NEWS RECEPTION APPARATUS THAT SELECTIVELY RETAINS SECTIONS AND SEARCHES BY KEYWORD OR INDEX FOR TEXT TO SPEECH CONVERSION

FIELD OF THE INVENTION

The invention relates to a device that receives an electronic edition of a newspaper and aurally reads selected portions of the newspaper to the user.

BACKGROUND OF THE INVENTION

In today's society, time is a precious commodity. People are busier than ever and finding the time to read the newspaper is increasingly difficult. However, many individuals consider reading the newspaper important and budget their time accordingly. The newspaper is typically read before commuting to work if one drives to work, or during the commute if a train or similar transportation is taken. For those who work at home, the paper is typically read either before or after the demands on their time have been satisfied. Reading the newspaper at any of these times has disadvantages.

Reading the newspaper before driving to work requires scheduling time in the morning for reading the paper. For those who work at home, reading the paper requires time that could be devoted to other tasks. Reading the newspaper on a train or bus is difficult due to the limited amount of space in which to hold the paper and problems of motion sickness, particularly when trying to read in stop-and-go traffic. This also requires complex folding and manipulation of the paper. Thus, only portions of articles can be completed, for example, those appearing on the front page.

SUMMARY OF THE INVENTION

The present invention is a news receiving apparatus for receiving an electronic edition of a newspaper. The news receiving apparatus includes a receiver for receiving the electronic edition of the newspaper. A section filter retains or discards sections of the electronic edition of the newspaper. A memory stores the retained sections of the electronic edition of the newspaper. The stored sections of the electronic edition of the newspaper are provided to a text-to-speech system (hereinafter the text-to-speech converter) which converts portions of the stored electronic edition of the newspaper to an audible output signal. The invention includes a user interface for establishing which sections of the electronic edition of the newspaper are retained by the section filter and for controlling which portions of the electronic edition of the newspaper are provided to the text-to-speech converter.

DETAILED DESCRIPTION

Figure 1:
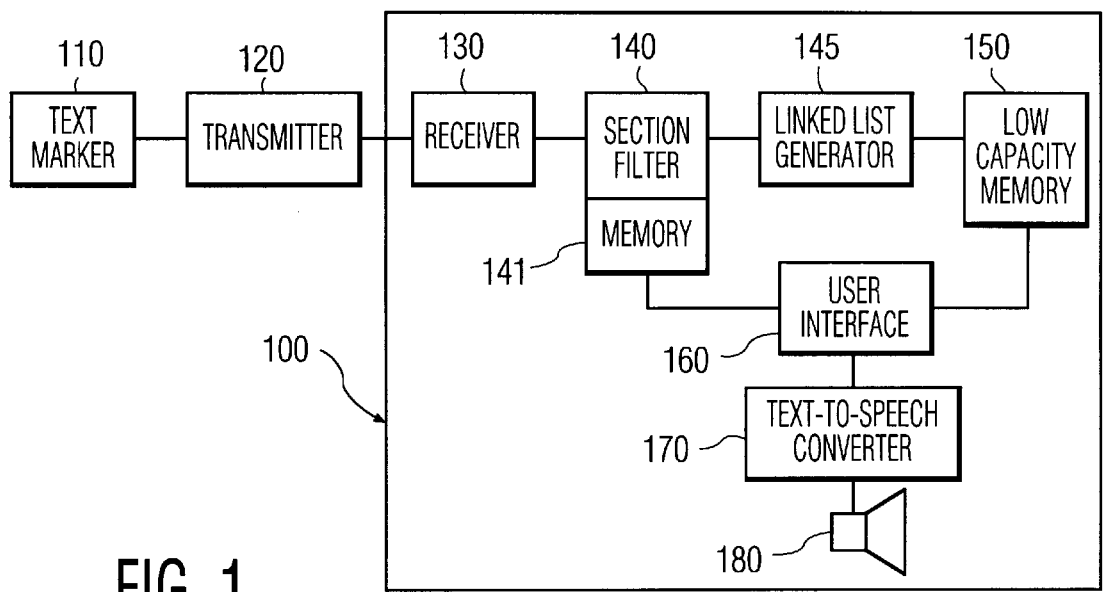
FIG. 1 is a functional block diagram of a news delivery system.

FIG. 1 illustrates the news delivery system. The portable newsreader which receives and stores the electronic edition of the newspaper is designated by reference numeral 100. A text marker 110, located at an electronic news preparer's facility, formats the newspaper articles so that the newsreader 100 can interpret the received news articles. The details of the text marker 110 are described below with reference to Table I. Transmitter 120 receives the marked news articles from text marker 110 and transmits the marked news articles to the portable newsreader 100. Receiver 130, located within the newsreader 100, receives the marked news articles transmitted by the transmitter 120. Details of an exemplary transmitter 120 and receiver 130 are described below with reference to FIG. 3.

A section filter 140 retains sections of the news that interest the user and discards the remaining sections. The section filter 140 performs a search algorithm, which is set by the user, to look for articles of certain types. For instance, only those articles related to sports and business. The section filter 140 includes a memory 141 that stores a list of sections selected by the user. The articles that pass through the section filter 140 are sent to a linked list generator 145 which stores the desired articles in a low capacity memory 150. The details of the linked list generator 145 are described below with reference to FIG. 12.

The minimum storage capacity of the low capacity memory 150 can be calculated based on the following factors:

(1) The low capacity memory 150 should be able to store written text to be converted to X hours or about X hours of speech where X equals, for example, two and assuming the text is not compressed.

(2) Assume a speech rate of M syllables per minute with an average of N syllables per word. If M equals 300 and N equals two, for example, the speech rate equals 150 words per minute or 9000 words per hour.

(3) Assume an average of P letters per word where P equals, for example, seven based on the use of sophisticated wording.

Using the above factors, the storage capacity of low capacity memory 150 may be calculated using the equation below.

$$X = Y \cdot ((M/N) \cdot 60) \cdot P$$

For the exemplary values above, the storage capacity is:
$X = 2 \cdot ((300/2) \cdot 60) \cdot 7 = 126{,}000$ letters or characters.
Assuming 8 bits per character, the storage requirement of the low capacity memory 150 is 126 kilobytes (KB). This can easily be achieved by using on-board battery-backed RAM or a floppy disk.

User interface 160 is used to establish the search algorithm performed by the section filter 140. The user interface 160 is also used to control playback of stored news article during playback mode. The details of an exemplary user interface 160 are described below.

A text-to-speech converter 170 and a speaker 180 are coupled to the user interface 160. The news articles stored in the low capacity memory 150 and retrieved through user interface 160 are provided to the text-to-speech converter 170. The text-to-speech converter 170 and speaker 180 provide an audible output signal which corresponds to the text of news articles. The details of the text-to-speech converter 170 are described below with reference to FIG. 18.

Figure 5:
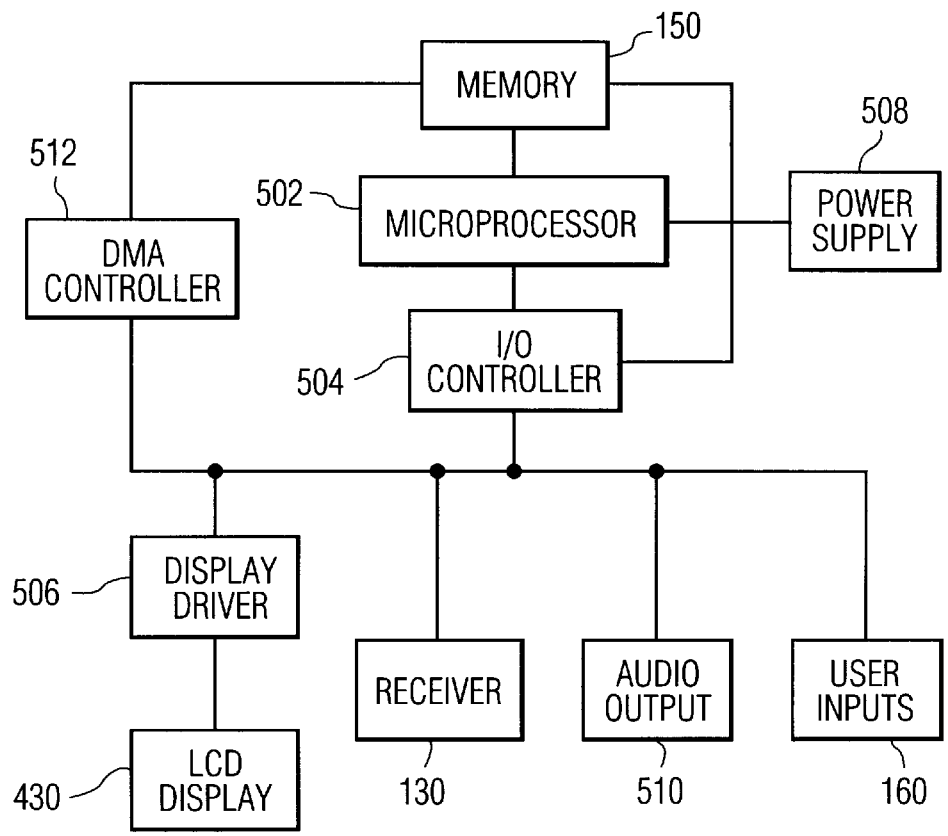
FIG. 5 is a block diagram of the hardware included in the device shown in FIG. 4.

The functional blocks shown in FIG. 1 are implemented using the hardware shown in FIG. 5. The section filter 140, linked list generator 145, user interface 160 and text-to-speech converter 170 are processes which are executed by the microprocessor 502 in FIG. 5. Memory 141 is a data structure that resides in memory 150.

Table 1 illustrates the marking inserted into the electronic news articles by text marker 110 (shown in FIG. 1).

TABLE 1

<begin section> World News <end section>
<begin headline> President Travels to ... <end headline>
<begin lead paragraph> Washington, D.C. ... <end lead paragraph>
<begin body> The President will arrive in <P>Bihac<Pdata> to address the... <end body>

Figure 2:
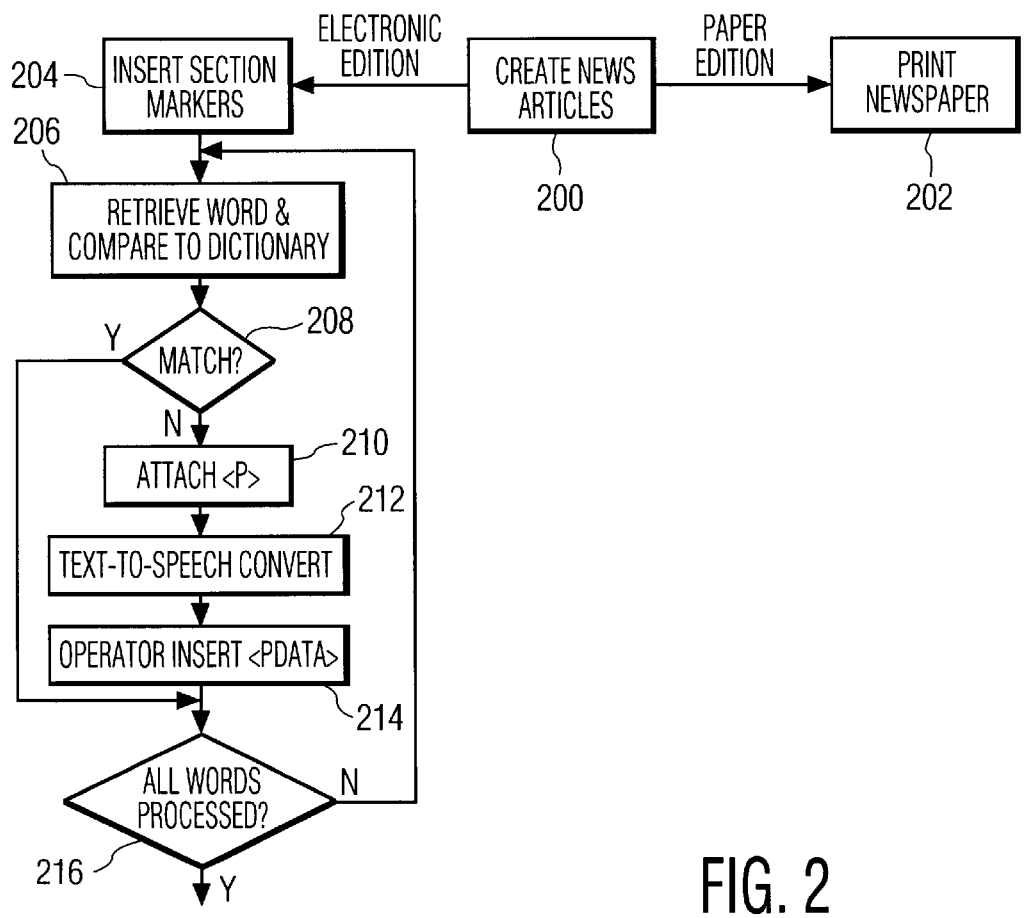
FIG. 2 is a flow chart of the process performed to create the electronic edition of the newspaper.

In today's newspaper world, newspapers are written, assembled, and printed using electronic systems that, for the most part, function as elaborate word processors. FIG. 2 shows the steps followed to produce the paper edition and the electronic edition of the newspaper. A news article that is finished from an editorial standpoint consists of a computer file of ASCII characters with imbedded control characters just like files produced by commercial word processors. FIG. 2 illustrates how the electronic edition of the newspaper is generated. Step 200 is the initial creation of the news articles by the newspaper editors. Today, the articles are generated on word processors and the text of the articles is represented by ASCII files. For the paper version of the newspaper, the ASCII files and any graphics or photographs are sent to be printed at step 202. Modern printers have the ability to layout the newspaper and print the newspaper based on the ASCII files and graphic or photograph information.

For the electronic version of the newspaper, at step 204, an electronic news preparer modifies the ASCII text files (without accompanying graphics or photographs) by inserting the <section>, <headline>, <lead paragraph> and <body> markers shown in Table 1 to As shown in Table 1, the section of the newspaper that the article appears in is designated by <begin section> and <end section> markers. This allows the section filter 140 to determine whether a received article should be discarded or retained as described in detail below. The headline is also marked with <begin headline> and <end headline> markers which are used during headline playback described below. Certain words such as Bihac in Table 1 include a pronunciation flag <P> and pronunciation data <Pdata> that is used by the newsreader 100 to pronounce words that do not comply with pronunciation rules. A detailed description of how the newsreader uses the pronunciation data is described below with reference to FIG. 18. It is understood that the text markers may be implemented using special, control characters instead of the phrases placed between brackets as described above.

At step 206 of FIG. 2, a word from the article is compared to a pronunciation dictionary which includes words that the text-to-speech converter 170 can accurately pronounce. The pronunciation dictionary at the electronic news preparer's facility includes words that have been previously stored in the dictionary search module 712 and words that follow the letter-to-sound rules used in the letter-to-sound module shown in FIG. 18. The pronunciation dictionary is a record of all the words the newsreader 100 can accurately pronounce. At step 208, if the word matches an entry in the pronunciation dictionary, it is determined that the text-to-speech converter can pronounce the word and no further processing is performed. The process jumps to block 216 where it is determined whether all words in the newspaper have been processed. If the retrieved word does not match any entries in the pronunciation dictionary, at step 210 the <P> flag is attached to the word as shown in Table 1. The word is then converted to speech at step 212 and audibly read to an operator of the electronic news preparer. At step 214 the operator determines if pronunciation data is needed and inserts the <Pdata> information shown in Table 1 accordingly. The <Pdata> information may include a phonetic equivalent of the word that will be used by text-to-speech converter 170 to accurately pronounce the word. At step 214, the operator can submit the <Pdata> information back to the text-to-speech converting step 212 to confirm that the entered <Pdata> information accurately reflects the proper pronunciation of the word. When the operator is satisfied that the pronunciation is proper, the process flows to step 216 where it is determined whether all words have been processed.

Figure 3:
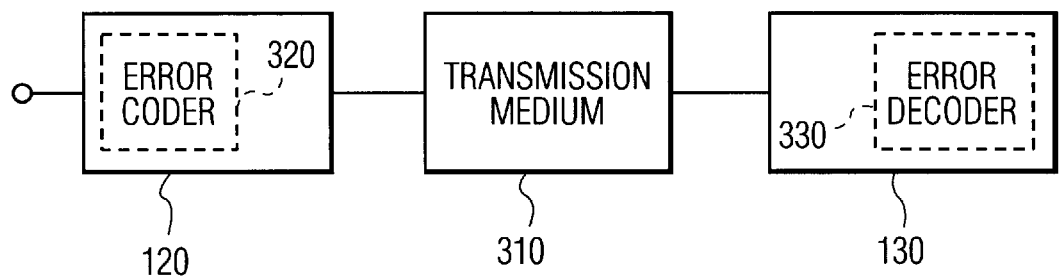
FIG. 3 is a functional block diagram of a portion of the news delivery system of FIG. 1.

FIG. 3 illustrates the transmitter 120 and receiver 130. Transmitter 120 receives the marked news articles and transmits the marked news articles, through a transmission medium 310, to receiver 130. An optional error coder may 320 may be included in the transmitter 120 along with a corresponding error decoder 330 in receiver 130. Examples of known error detection and correction schemes are Hamming codes, checksums, or cyclic redundancy codes (CRC) which are commonly used in modem communications. Error coding is used to detect or reduce errors in the transmission of the news articles. The particular transmission medium used dictates what components are included in the transmitter 120 and receiver 130. The following are potential transmission media 310 for the newsreader 100.

Telephone: This is one of the most expensive of the potential media. Nevertheless, it would allow a significant decrease in cost in the consumer unit since the filter to provide the subscriber's individual section of news could be at the electronic news preparer's facility rather than in the subscriber's unit at home as shown in FIG. 1. The cost of such a system implementation would be a rather sophisticated transmitter 120 at the electronic news preparer's facility.

The exemplary transmitter 120 and the receiver 130 include modems with a data transfer rate of 9600 baud, 14,400 baud, or 28,800 baud. Of course, both modems include the appropriate RJ-11 connectors for connecting to the telephone lines. These data rates are sufficient to complete the downloading of the electronic edition of the newspaper overnight without requiring expensive modems. Error rates for this type of system are generally low, reducing the complexity and expense of error coder 320 and error decoder 330.

CATV: This would be an ideal medium, except for the fact that only about 65% of the nation subscribes to cable television. CATV allows data rates to be extremely high, extending into the megabaud region. In addition, error rates would be low, reducing the complexity and expense of error coder 320 and error decoder 330. The electronic edition of the newspaper may be transmitted on an entire cable channel which would provide a large bandwidth. The electronic news preparer forwards the electronic edition of the newspaper to local cable operators. The local cable operators then transmit the electronic edition of the newspaper to subscribers. Thus, transmitter 120 is located at a local cable operator's facility. The receiver 130 in newsreader 100 includes a coaxial cable connector for coupling to the cable source and a signal decoder.

Instead of using an entire cable channel, the electronic edition of the newspaper may be transmitted during the vertical blanking interval (VBI) of a television transmission. This area of a television transmission has been used in the past for teletext systems. The electronic news preparer provides the electronic edition of the newspaper to a local television station. The television station inserts the electronic edition of the newspaper in the VBI. Transmitter 120 is located at the local television station. The receiver 130 may include a conventional teletext decoder to extract the electronic edition of the newspaper from the VBI.

AM/FM Subsidiary Communications Spectrum
Generally, broadcast stations have extra space in their multiplexed stereo spectrum that is available for use in non-entertainment applications. Broadcasters may transmit information by modulating subcarriers as specified under the FCC's subsidiary communications authorization (SCA). This subcarrier modulation has been used for data delivery in the past with reasonable reliability. The data rate can be several hundred kilobaud. Unfortunately, channel impairments can be bad enough to overpower any error correction scheme except for automatic retransmission. Thus, the transmitter 120 must have the ability to retransmit the electronic edition of the newspaper multiple times during a transmission time period. This should not be a problem since the transmission of the electronic edition of the newspaper occurs overnight, where there should be adequate time for multiple transmissions.

If this medium is used, the transmitter 120 includes a modulator for either amplitude modulating or frequency modulating a subcarrier signal. The receiver 130 includes an antenna, a tuner and a demodulator for reception.

Satellite: Any newspaper company with national distribution in its sights will consider satellite distribution. On either a C- or Ku-band geosynchronous transponder of moderate power, megabaud transmission rates could be achieved (the Ku-band allowing for small antennas) except for the far northern portion of the US and all of Canada. Using the low-earth-orbit (LEO) networks that are currently being deployed for cellular telephony applications, only a small whip antenna would be needed at the receiver 130.

As shown in FIG. 1, the section filter 140 is linked to the user interface 160. This allows the user to command the section filter 140 to retain only desired portions of the electronic edition of the newspaper. User interface 160 can be one of two types. The basic user interface 160 allows only a limited number of operations and retrieves news articles based on the section headings. The advanced user interface 166 (shown in FIG. 19) provides keyword searching and other advanced news article retrieval operations. The basic user interface 160 and the section filter 140 are described below.

Figure 4:
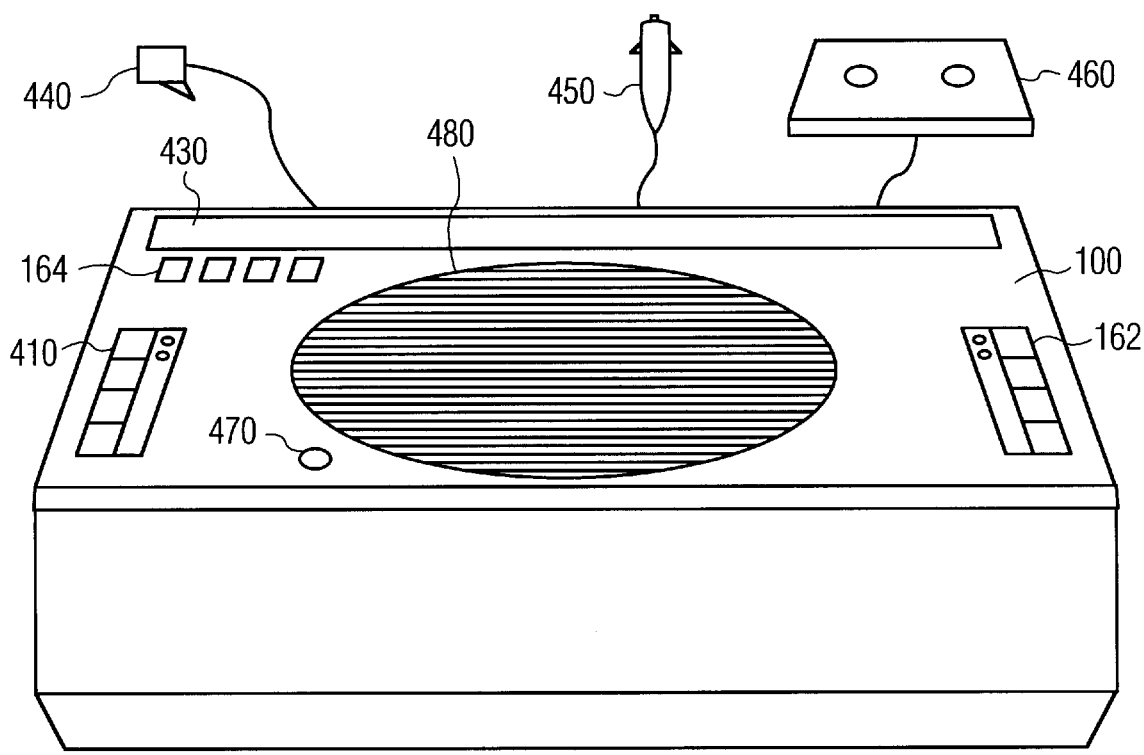
FIG. 4 is a perspective view of a stand alone newsreader.
Figure 6:
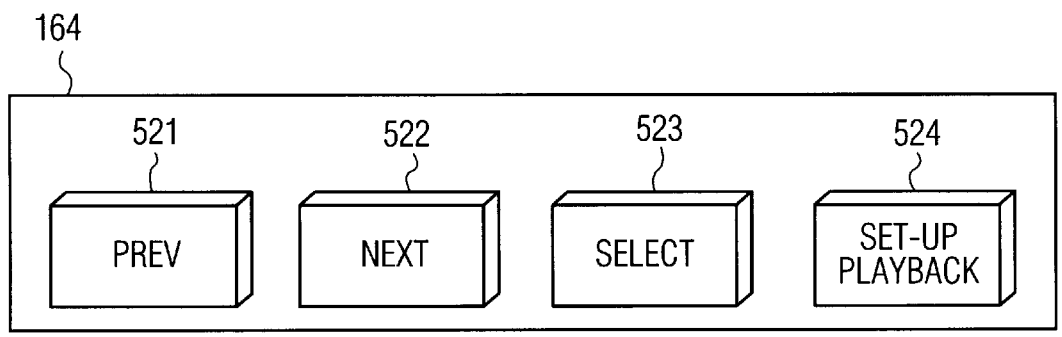
FIG. 6 is a block diagram of the setup controls for the basic user interface for the device shown in FIG. 4.
Figure 13:
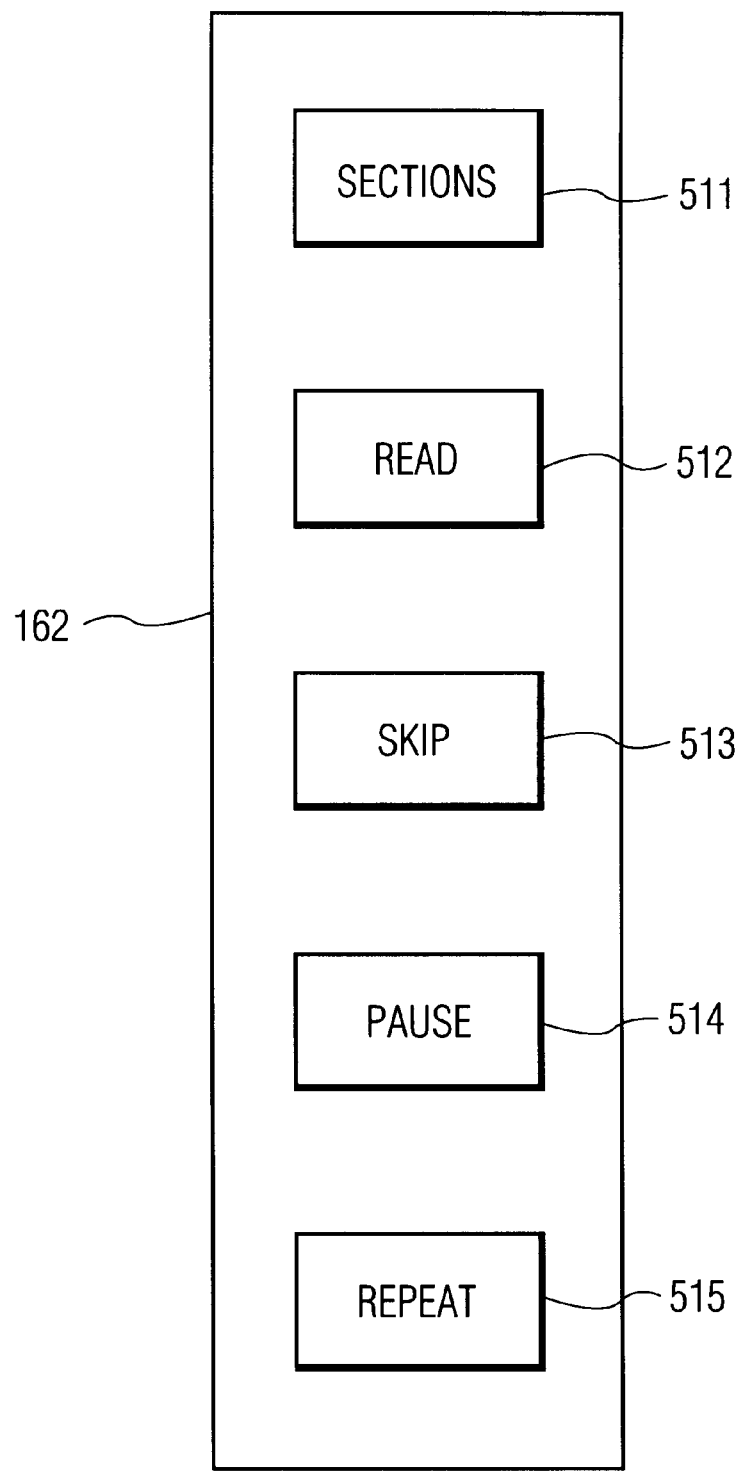
FIG. 13 is a block diagram of the playback controls for the basic user interface for the device shown in FIG. 4.

FIG. 4 shows an exemplary newsreader 100 which is equipped with a basic user interface 160. The basic user interface 160 includes set-up controls 164 and playback controls 162. FIG. 6 is an enlarged view of the setup controls 164. FIG. 13 is an enlarged view of the playback controls 162. The newsreader 100 shown in FIG. 4 includes an RJ-11 connector 440 for downloading the electronic edition of the newspaper over telephone lines. Of course, a transmission medium other than telephone lines would require different hardware as described above. Download and modem controls 410 are used to control the parameters (baud rate, parity, stop bit, etc.) of an internal modem (not shown) coupled to the connector 440. A LCD display 430 provides messages to the user. The newsreader 100 can be powered by an AC adapter (not shown) or a set of batteries (not shown) while it is loading the electronic edition of the newspaper. A power adapter 450 can be plugged into a cigarette lighter in an automobile to provide power to the newsreader 100 while it is in use. Adapter 460 is a cassette emulator that allows the audible output of the newsreader 100 to be heard through the automobile sound system. A loudspeaker 480 and earphone jack 470 provide alternate means for hearing the audible output signal produced by the newsreader 100.

FIG. 5 is a functional block diagram of the hardware elements within the newsreader 100 shown in FIG. 4. Microprocessor 502 controls the operation of the newsreader 100. Commands from the user interface 160 are routed to the microprocessor 502. Display driver 506 is coupled to microprocessor 502 and enables messages to be displayed on the LCD display 430. The input/output controller 504 provides for communications to and from the microprocessor 502 and external devices. The receiver 130 may be any of the various communication devices described above with reference to FIG. 3. For example, if the newsreader 100 uses telephone lines, receiver 130 may be a modem. If the newsreader 100 receives AM/FM SCA transmissions, the receiver 130 may include a tuner and a demodulator. An audio output device 510 may include the speaker 480, earphone adapter 470 and/or cassette emulator 460 (shown in FIG. 4). The DMA controller 512 provides for writing and reading of news articles to memory 150.

Figure 7:
FIG. 7 illustrates the display of the device shown in FIG. 4 during setup mode.

The setup controls 164 and the playback controls 162 make up the basic user input interface 160. As shown in FIG. 6, the set-up controls 164 include a series of buttons labeled Prev, Next, Select, and Set-up/Playback. To set-up the newsreader 100, the user first presses the Set-up/playback button 524 to enter the set-up mode. The Set-up/Playback button 524 toggles the newsreader 100 between the setup and playback modes. Entering the set-up mode causes a list of available news sections to be retrieved from memory 141 (shown in FIG. 1). As shown in FIG. 7, the list of available sections is displayed on the LCD display 430, one section at a time. The available sections are transmitted to the newsreader when a subscriber first requests delivery of the electronic edition of the newspaper.

The section filter 140 includes a memory 141 (shown in FIG. 1) which stores the available sections. The user can scroll through the sections using the Prev button 521 (to move backwards through the list) or the Next Button 522 (to move forwards through the list). If the user wants the section filter 140 to retain the articles in a section, the Select button 523 is pressed while the section title is displayed on the LCD 430. An indicator 540 (for example a check or an "x"), shown in FIG. 7, is displayed next to the section name to indicate that articles which are associated with this section will be retained by section filter 140.

In addition, a select bit 1422 (shown in FIG. 11) associated with each section is toggled from zero to one. The select bit 1422 is used to identify the sections that have been selected by the user. The user can then browse through the remaining sections and select sections of the newspaper to be retained using the Select button 523. The Select button 523 toggles the status of the displayed section from either selected or de-selected so that the user can delete a previously retained section. When the user has completed selecting the desired sections, the Set-up/playback button 524 is pressed. This exits set-up mode and stores the selected section information in memory 141 (shown in FIG. 1). The stored selected section information is used by section filter 140 to determine which sections of the received newspaper should be stored into the memory 150.

Figure 8:
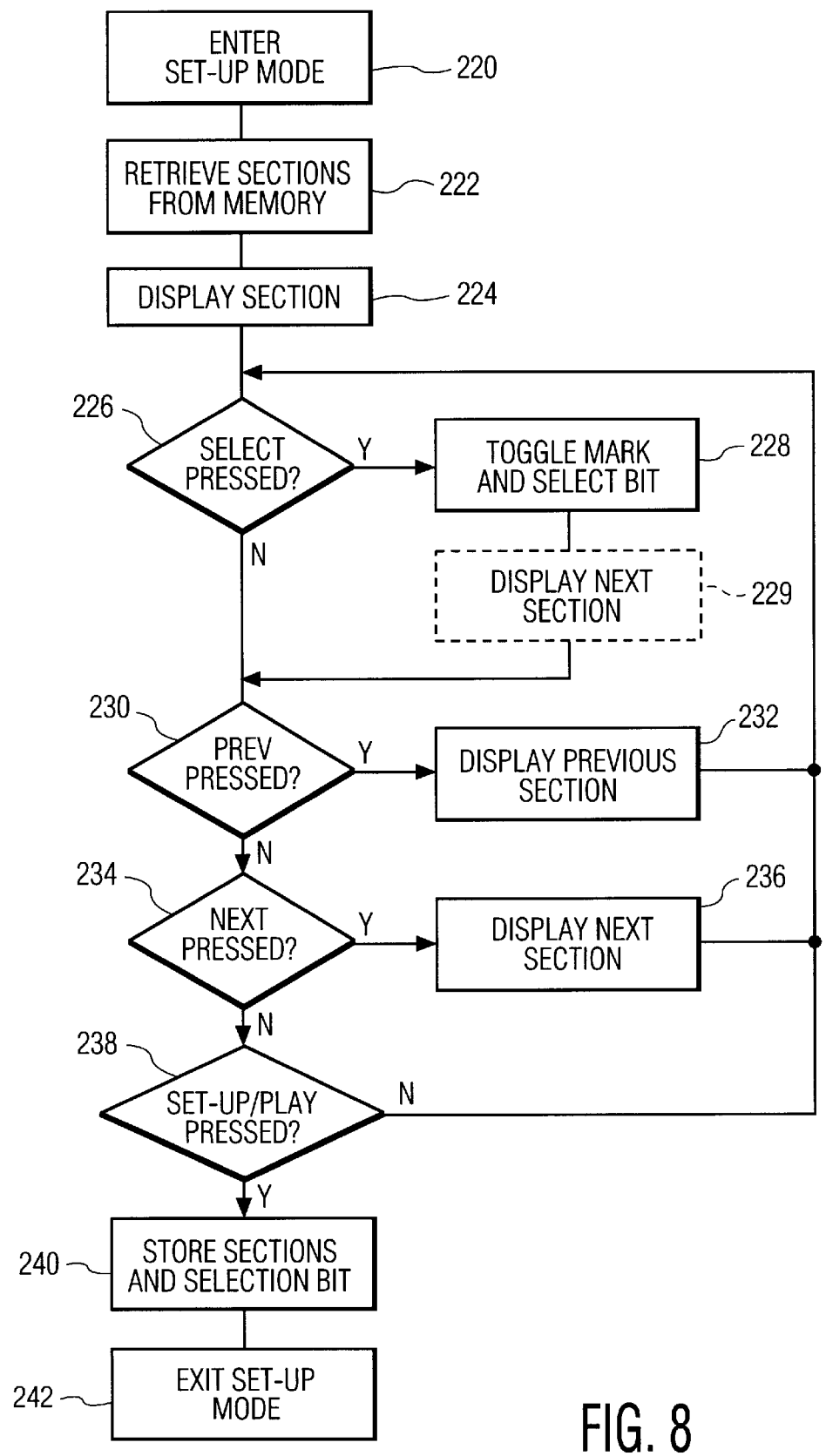
FIG. 8 is a flowchart of the setup mode.

FIG. 8 is a flowchart illustrating the steps performed during setup mode. At step 220, the setup mode is entered when the user presses the Setup/playback button 524. The list of available sections is retrieved from memory 141 of section filter 140 (both shown in FIG. 1) at step 222. At step 224, the first section identifier is displayed. If this section has been selected (i.e. has a select bit 1422 of one), a mark appears next to the section identifier as shown in FIG. 7. Step 226 determines if the Select button 523 has been pressed. If so, at step 228, the select bit 1422 associated with the current section is toggled and the mark (shown in FIG. 7) is toggled from one state to the other. In an alternative embodiment, after step 228, the next section is displayed at step 229 after the user presses the Select button 523 to de-select or select the section.

Step 230 determines if the Prev button 521 has been pressed, and if so, the process displays the previous section in step 232. Step 234 determines if the Next button 522 has been pressed, and if so, the process displays the next section in step 236. If the Setup/playback button is pressed at step 238, the sections are stored in memory 141 (shown in FIG. 1) along with the select bit which indicates if a section has been selected at step 240.

Figure 9:
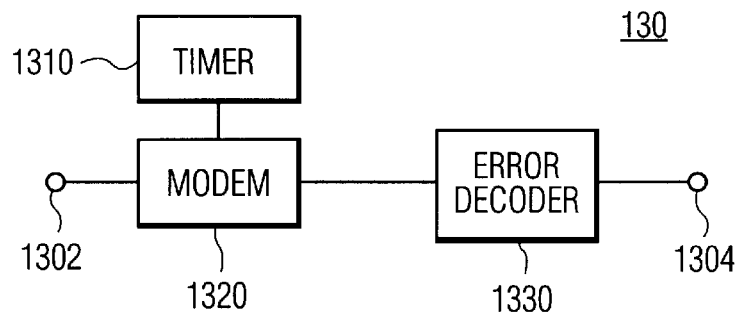
FIG. 9 is a functional block diagram of the receiver shown in FIG. 1.

Referring to FIG. 1, once the section list and the associated section bits have been stored in memory 141, the newsreader 100 is ready to receive the electronic newspaper. In the exemplary embodiment, the receiver 130 receives the electronic edition of the newspaper in the early morning hours before dawn. The receiver 130 contacts the transmitter 120 and initiates the transfer of the electronic edition of the newspaper to the newsreader 100. FIG. 9 shows hardware elements within the receiver 120 which are used for the automatic downloading of the electronic edition of the newspaper. As shown in FIG. 9, the receiver 130 includes a timer 1310. The timer 1310 determines whether it is time to call the electronic news preparer. At the appropriate time (some time in the early morning) the timer 1310 instructs the modem 1320 to call the transmitter. As described above, other communications devices may be used. For example, if the electronic edition of the newspaper is received through AM/FM SCA broadcast, the timer would enable a tuner/demodulator circuit (instead of modem 1320) to begin receiving the electronic edition of the newspaper. In addition, the electronic edition of the newspaper may be provided from another source such as a cable company which is provided the electronic edition by the electronic news provider.

The electronic edition of the newspaper is received at input terminal 1302 and forwarded to the modem 1320. The error coder 1330 receives the output of the modem 1320. The error decoder is optional (as described above with respect to FIG. 3), and is included in FIG. 9 for completeness. The error decoder can detect errors in the received electronic edition of the news based on Hamming codes, CRC codes, etc. If errors are detected, they may be corrected by the error decoder 1330. Alternatively, the modem 1320 may be instructed by the error decoder 1330 to call the electronic news preparer again and to download the electronic edition of the newspaper. If a communications device other than a modem is used, for example an AM/FM SCA receiver, upon detection of an error that cannot be corrected, the error decoder 1330 instructs the receiver to continue receiving the electronic edition of the newspaper until an error free copy has been received.

Figure 10:
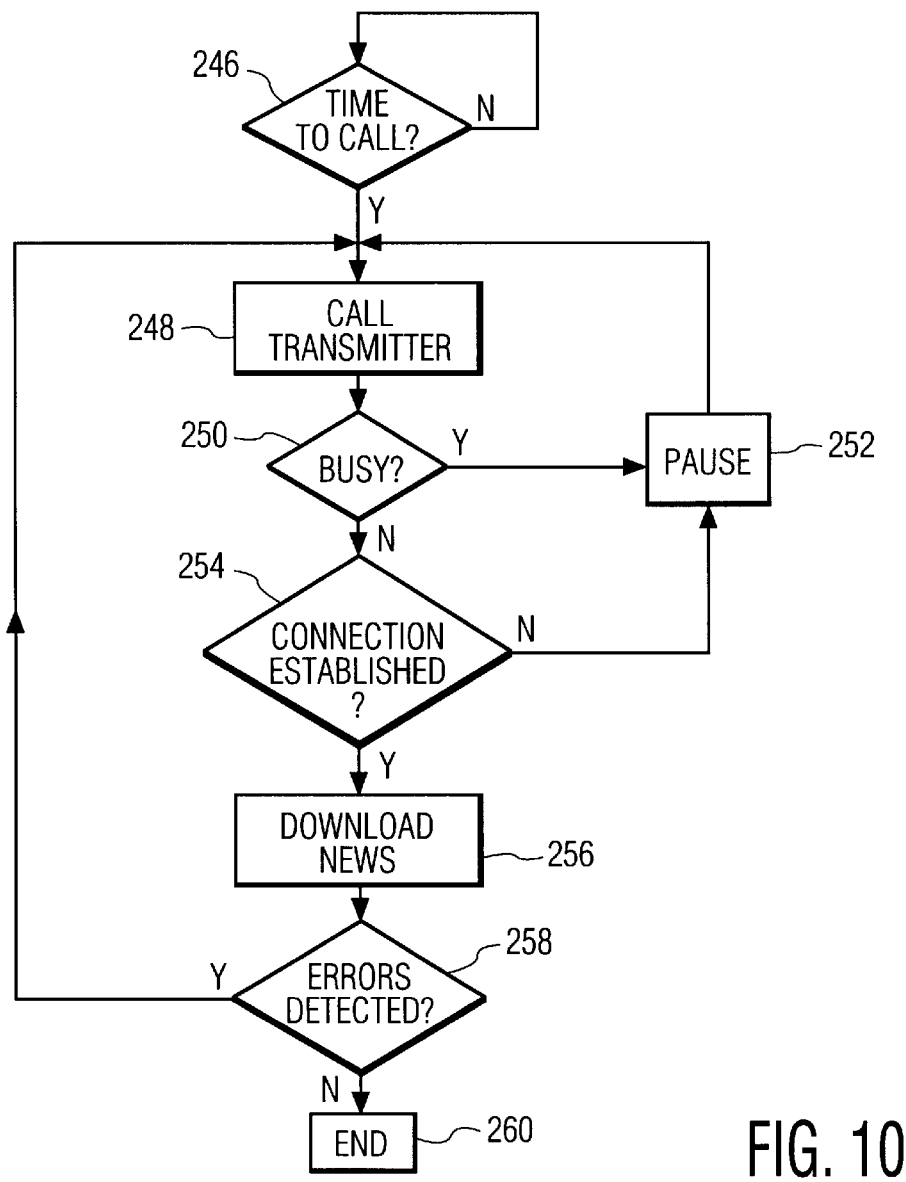
FIG. 10 is a flowchart of the process executed by the hardware shown in FIG. 9.

FIG. 10 is a flowchart of the process executed by the receiver 130. The flowchart is directed to the embodiment in which a modem is used as the communication device. At step 246 it is determined by timer 1310 (shown in FIG. 9) whether it is time to call the transmitter 120. If so, at step 248 the modem 1320 is instructed to call the transmitter 120 (shown in FIG. 3). If the transmitter 120 is busy at step 250, the modem pauses for a brief period of time (for example, 20 seconds) and then calls the transmitter 120 again. At step 254 it is determined whether the modem 1320 has connected to the transmitter 120. If no connection can be established, the modem enters the pause state at step 252 and then calls transmitter 120 again. If the connection has been established at step 254, the modem downloads the electronic edition of the newspaper at step 256. If error detection is included in the receiver 130, step 258 detects whether any unrecoverable errors exist in the received electronic edition of the newspaper. If so, the modem 1320 contacts the transmitter 120 again to download an error free version of the electronic edition of the newspaper. If the received version is error free, step 258 proceed to step 260 where the download process is completed. Although the flow chart shown in FIG. 10 indicates that the entire newspaper would be downloaded again if an unrecoverable error is detected, it is contemplated that only those portions of the newspaper containing the errors may be selectively downloaded in the retry process.

Figure 11:
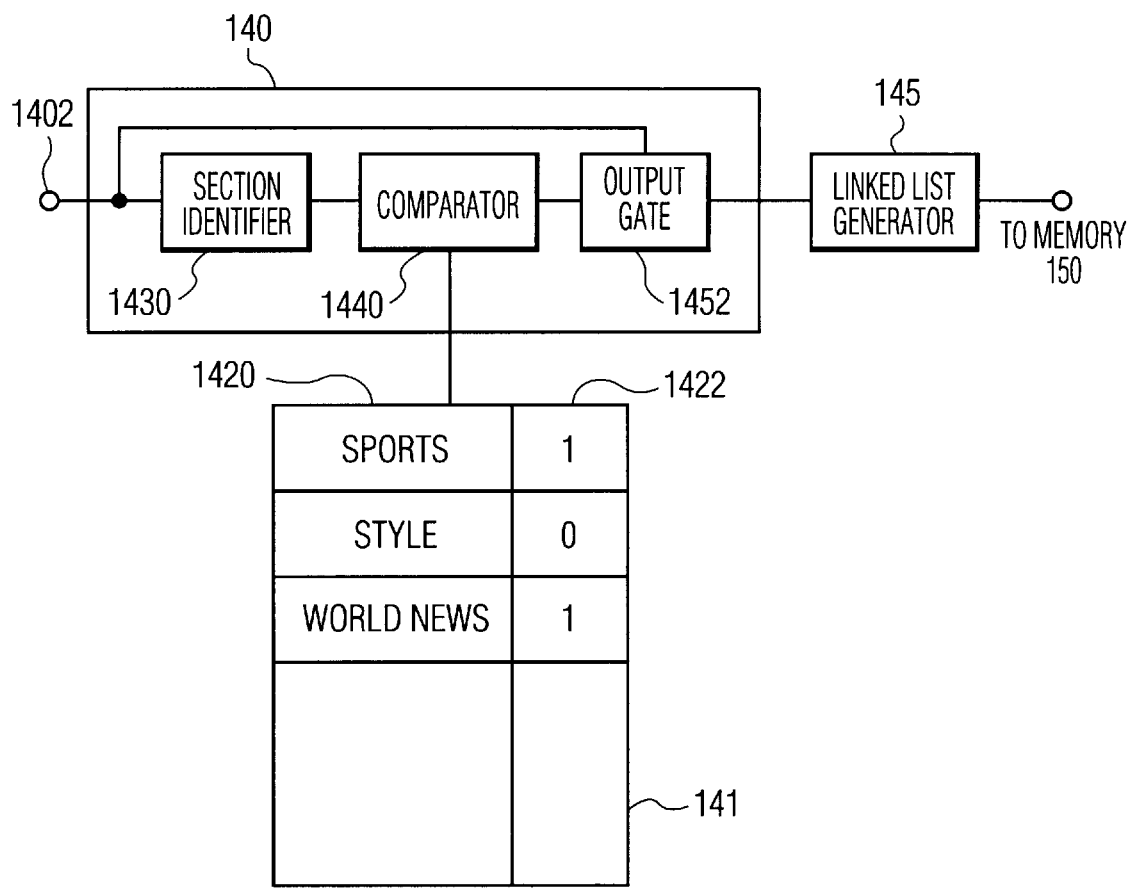
FIG. 11 is a functional block diagram of a portion of the newsreader shown in FIG. 1.

The text received by receiver 130 is provided to the section filter 140. FIG. 11 is a functional block diagram of the section filter 140 and a linked list generator 145. The section filter 140 and linked list generator 145 are functions which are implemented by the microprocessor 502 (shown in FIG. 5). The memory 141 is a data structure that is stored in memory 150 (shown in FIG. 5). The electronic edition of the newspaper from receiver 130 is provided to the section filter 140 at input terminal 1402. The section identifier 1430 identifies the section field by locating the <begin section> marker (see Table 1 above). The section identifier 1430 may simply compare input ASCII codes identifying the <begin section> marker to a stored codeword in order to locate the section heading. The section field may contain more than one section heading. For example, if an article appears in both the Sports section and the Business section, the section field would be as follows:

<begin section>Sports;Business<end section>

Allowing the section field to include two or more section headings prevents the newsreader from storing duplicate articles. The identified section heading or headings are forwarded to a comparator 1440. A second input to the comparator is received from memory 141. The memory 141 stores a list of the available sections 1420. In addition, memory 141 includes the select bit 1422 which indicates whether the user has requested that a section be retained by section filter 140. In the example in FIG. 11, the Sports and World News sections have a select bit 1422 value of one, which indicates the user wishes to retain these sections. The comparator 1440 compares the section headings 1420 having a select bit 1422 value of one to the received section headings provided by section identifier 1430. If a match occurs, the comparator provides an output signal (for example a logic one) to output gate 1452. Output gate 1452 provides only desired articles to linked list generator 145 for storage in memory 150. In this way, only those articles of interest to the user are stored in low capacity memory 150.

Figure 12:
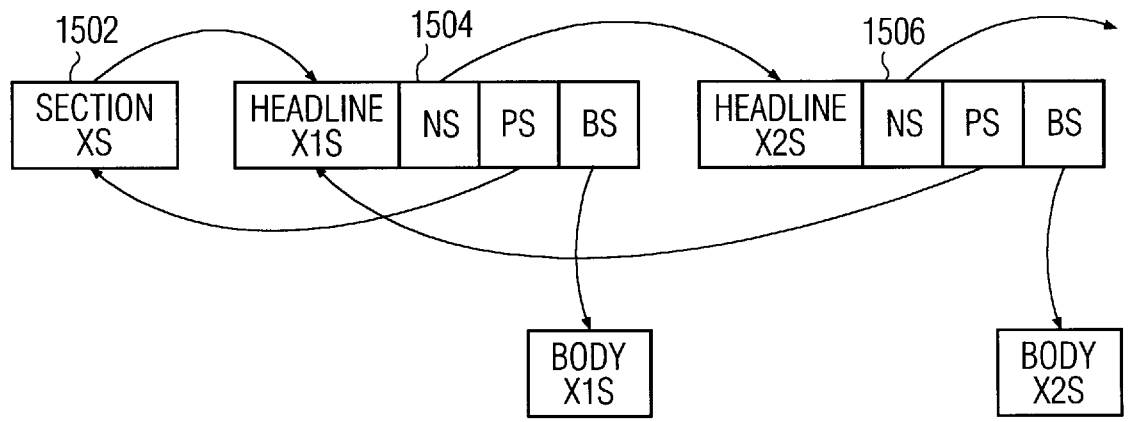
FIG. 12 illustrates how the news articles are stored in the memory shown in FIG. 1.

FIG. 12 shows an example of how the news articles may be stored in memory 150 by the linked list generator 145. Linked lists are made up of a series of nodes, each including at least two fields. The linked list shown in FIG. 12 represents the articles stored in memory 150 associated with section heading XS. The first node 1502 is a head node and corresponds to the head of the linked list that includes all the articles associated with section XS. If an article appears in more than one section, the article is stored in the linked list corresponding to the first section heading in the section field. Head node 1502 points to the data field node 1504. The data field stores the headline of article X1 appearing in section XS. Node 1504 also includes NS, PS, and BS fields. The NS field points to the data field of the next node in the linked list 1506. The PS field points to the previous node in the linked list. The BS field points to a location in memory where the body of article X1S is stored. As each article is received by the linked list generator 145 (shown in FIG. 11), a node is added to the linked list shown in FIG. 12. This linked list structure may be used by the user interface 160 to access headlines and articles for audible output to the user.

To playback the stored articles, the user operates the playback controls 162, shown in detail in FIG. 13. The user first presses the Sections button 511. The headlines of the articles in the current section are consecutively read to the user. In addition, the current section is displayed on LCD 430 (shown in FIG. 4). Once the headlines for the current section are read, the newsreader automatically begins reading the headlines for the next section. If the user wishes to switch sections, the Section button 511 is pressed. If the user wants to hear the entire article corresponding to a read headline, the Read button 512 is pressed. The newsreader 100 then reads the entire article. The newsreader 100 can also pause between each read headline to allow the user adequate time to determine if she wants to hear the article corresponding to the headline just read. The next headline of the next article in the section is read if the read button is not pressed during the pause. If the user does not desire to hear the entire article, the Skip button 513 is pressed, and the newsreader 100 resumes reading article headlines starting with the article immediately following the just-read article.

In an alternative embodiment, the newsreader pauses after each headline is read. If the user wants to hear the entire article corresponding to the read headline, the Read button 512 is pressed. If The user wants to hear the next headline in the section, the Skip button 513 is pressed.

If the user wants to pause the reading of an article, the Pause button 514 is pressed. Reading of the article is resumed by pressing the Pause button 514 again. The user can also "rewind" the article by pressing the Repeat button 515. The article is "rewound" as long as the Repeat button 515 is pressed. When the Repeat button 515 is released, the reading of the article is resumed. The newsreader 100 includes circuitry (not shown) for identifying a location in memory 150, shown in FIG. 5, from which to resume reading of the article. As long as the Repeat button 515 is pressed the circuitry successively identifies locations in memory 150 corresponding to earlier portions of the article being read. In other words, the newsreader 100 "rewinds" the article. The newsreader 100 may include an audible cue to allow the user to determine how much of the article has been "rewound." For example, the newsreader 100 can generate a beep for every five seconds of the article which has been "rewound." In addition, a fast forward button (not shown) may also be provided for forwarding through the article being read. The fast forward option would operate in the same manner as the Repeat button 515 except that the user would hold down a different button, for example the read button, and the newsreader would fast forward through the article being read.

Figure 14:
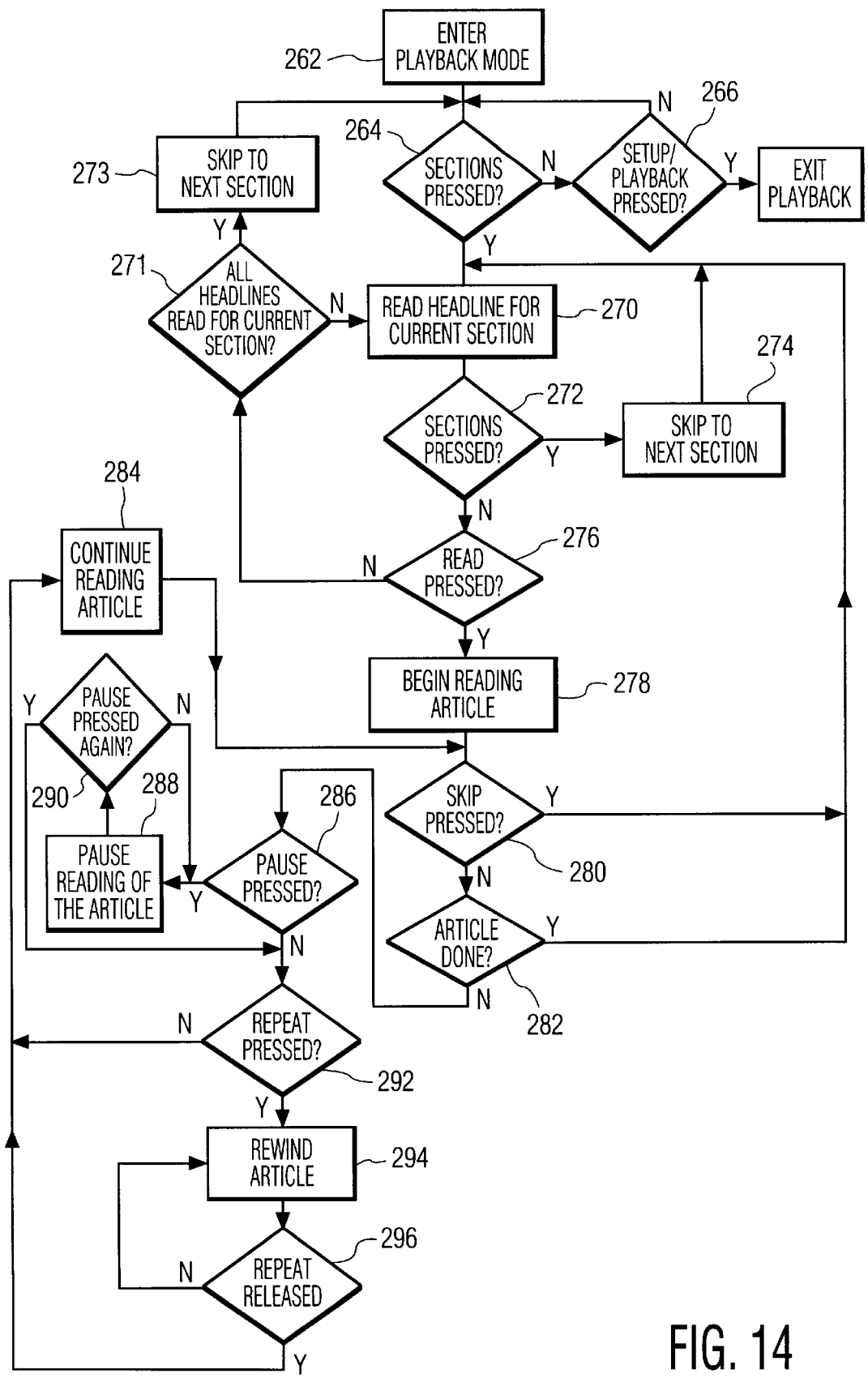
FIG. 14 is a flowchart of the playback mode.

FIG. 14 is a flow chart illustrating the process executed during playback mode. Playback mode is entered at step 262 by pressing the Setup/playback button 524 as described above (shown in FIG. 6). Step 264 detects whether the Sections button 511 has been pressed. If the Sections button 511 has been pressed, the process proceeds to step 270 where the first headline for the current section is read. If the user presses the Sections button 511 while the headline is being read, step 274 skips to the next section. If the user presses the Read button 512 while the headline is being read, step 276 proceeds to step 278 where the article corresponding to the read headline is read. If the Skip button 513 is pressed while the article is being read at step 280, the flow proceeds to step 270 where the next headline of the current section is read.

The flow proceeds to step 282. If the article is completed, the flow proceeds to step 270. Otherwise, the flow proceeds to step 286. At step 286, if the Pause button 514 is pressed, flow proceeds to step 288 where reading of the article is paused. At step 290, if the Pause button 514 is pressed again, the flow proceeds to step 292. Otherwise, the reading of the article continues to be paused at step 288. At step 292, if the Repeat button 515 is pressed, flow proceeds to step 294 where the article being read is rewound. The article is rewound at step 294 until it is determined at step 296 that the Repeat button 515 has been released. Steps 280 through 296 are repeated until a button is pressed or the reading of the article is completed.

Returning to steps 272 and 276, if neither the Sections button 511 nor the Read button 512 is pressed while the headlines are being read, step 271 determines if there are any more headlines in the current section. If not, flow proceeds to step 273 where the next section in memory 150 is selected as the current section. Flow proceeds to step 264 where the identical steps are performed for the new section.

Although the user command controls 162 are shown in FIG. 14 as being handled as part of the process, it is contemplated that these controls may be coupled to the microprocessor 502 (shown in FIG. 5) to cause interrupts. The interrupt handler would recognize which control had been activated and the current process being performed and cause the microprocessor 502 to take the appropriate action, as described above.

Figure 15:
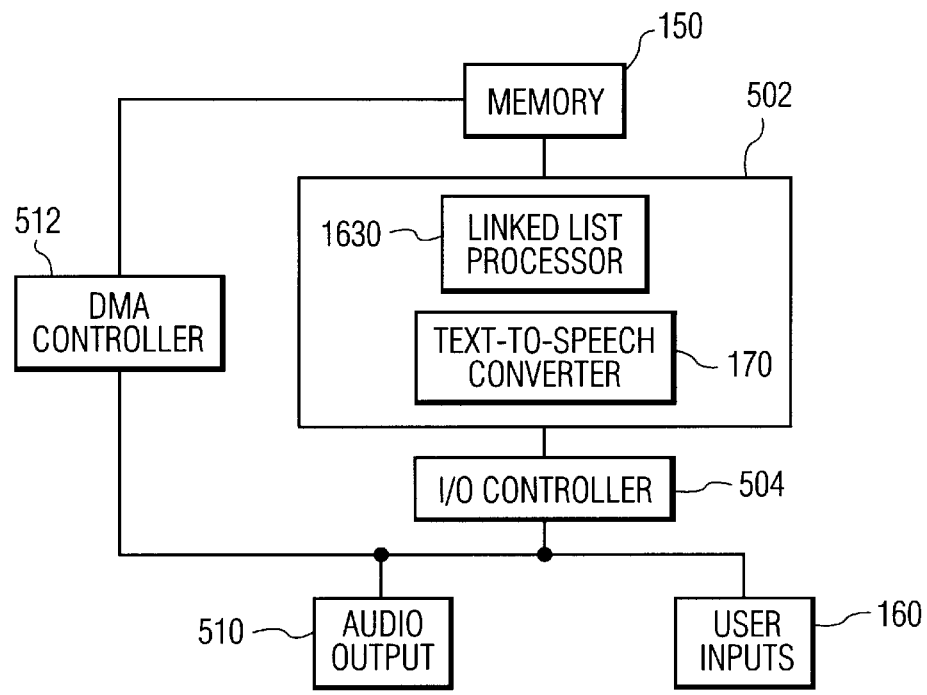
FIG. 15 is a functional block diagram of the hardware used for article playback.

FIG. 15 is a functional block diagram of hardware elements which may be used to access the articles stored in memory 150. User inputs 160 provide commands from the user such as Sections and Read as discussed above. Microprocessor 502 receives the commands from the user interface 160. The microprocessor operates as a linked list processor 1630 and the text-to-speech converter 170. The linked list processor 1630 accesses the linked list information (shown in FIG. 12) from memory 150 and uses the pointers stored in the linked list to locate articles for text to speech conversion. During playback, the newsreader starts in a sections mode. The linked list processor 1630 locates the first section's head node (1502 in FIG. 12). The linked list processor 1630 uses the pointer in node 1502 to locate headline node 1504. The first field of node 1504 includes a headline X1. The headline X1S is retrieved from memory and processed by the text-to-speech converter being executed by microprocessor 502. The text-to-speech converted signal is forwarded to the audio output 510. If the user has not indicated that an article should be read, the linked list processor 1630 locates node 1506 which is pointed to by the NS field of node 1504. Headline X2S is processed by the text-to-speech converter 170 and the output signal of the text-to-speech converter 170 is provided to the audio output 510. If the user requests that an entire article be read, the linked list processor 1630 uses the pointer in the BS field of a node (node 1504 for example) to locate the body of the article corresponding to the headline. Node 1504 includes a pointer to the body of article X1S. The linked list processor 1630 uses the pointer information in the BS field. The DMA 512 accesses the desired article and forwards it to text-to-speech converter 170.

The playback controls 162 shown in FIG. 13 allow the user to operate the newsreader 100 while driving to work. The newsreader 100 equipped with the playback controls 162 shown in FIG. 13 requires no more attention than a conventional car radio and thus does not interfere with the user's driving. Of course, the newsreader 100 can be used on trains, planes, buses or at home while other tasks are being performed.

Figure 16:
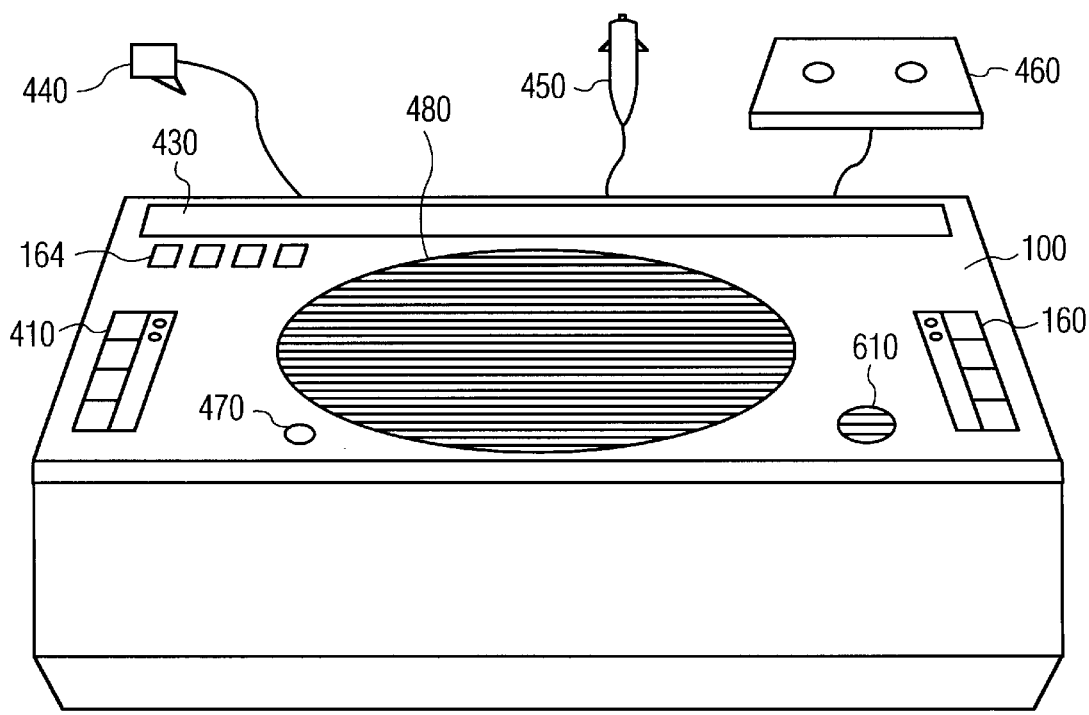
FIG. 16 is a perspective view of a variation of the stand alone newsreader shown in FIG. 4.
Figure 17:
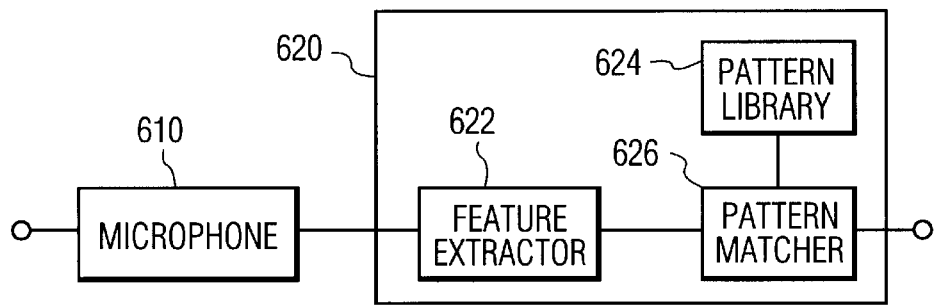
FIG. 17 is a functional block diagram of the speech recognition unit included in the device shown in FIG. 16.

A variation on the newsreader shown in FIG. 4 is shown in FIG. 16. The newsreader 100 is equipped with a microphone 610 that receives the voice commands "sections", "read", and "skip." The voice commands are processed by a speech recognition unit 620 located within the newsreader 100. FIG. 17 is a functional block diagram of the speech recognition unit 620. Voice commands are received by microphone 610 and provided to the speech recognition unit 620. A feature extractor 622 extracts features from the speech signal. Commonly used features for speech recognition are E1-frequency cepstral coefficients or MFCCs. The extracted features are provided to a pattern matcher 626. The pattern matcher compares the input feature vectors to feature vectors stored in a pattern library 624. The pattern library 624 is created through a training process. The feature extractor 622 and the pattern matcher are processes that are executed by the microprocessor 502 in FIG. 5. The pattern library 624 is a data structure that resides in memory 150 shown in FIG. 5. Because the newsreader 100 only recognizes three words (sections, read and skip), the newsreader 100 can be trained by the manufacturer. This limited vocabulary does not require training for a specific user which may be necessary in more complex speech recognition systems. The pattern matcher 626 matches the feature vector derived from the input speech to feature vectors stored in pattern library 624. The pattern matcher 626 uses conventional pattern matching techniques (such as Hidden Markov Models) to produce an output signal representing the most likely identity of the speech. The voice recognition unit 620 is a conventional voice recognition device which employs known voice recognition techniques as disclosed in "Deployable Automatic Speech Recognition Systems: Advances and Challenges", AT&T Technical Journal, March/April 1995 which is hereby incorporated by reference. The voice commands "sections", "read", and "skip" operate the newsreader 100 in the same fashion as the playback controls 162 described above. The speech recognition unit 620 allows the user to operate the newsreader without physically touching the newsreader 100.

Figure 18:
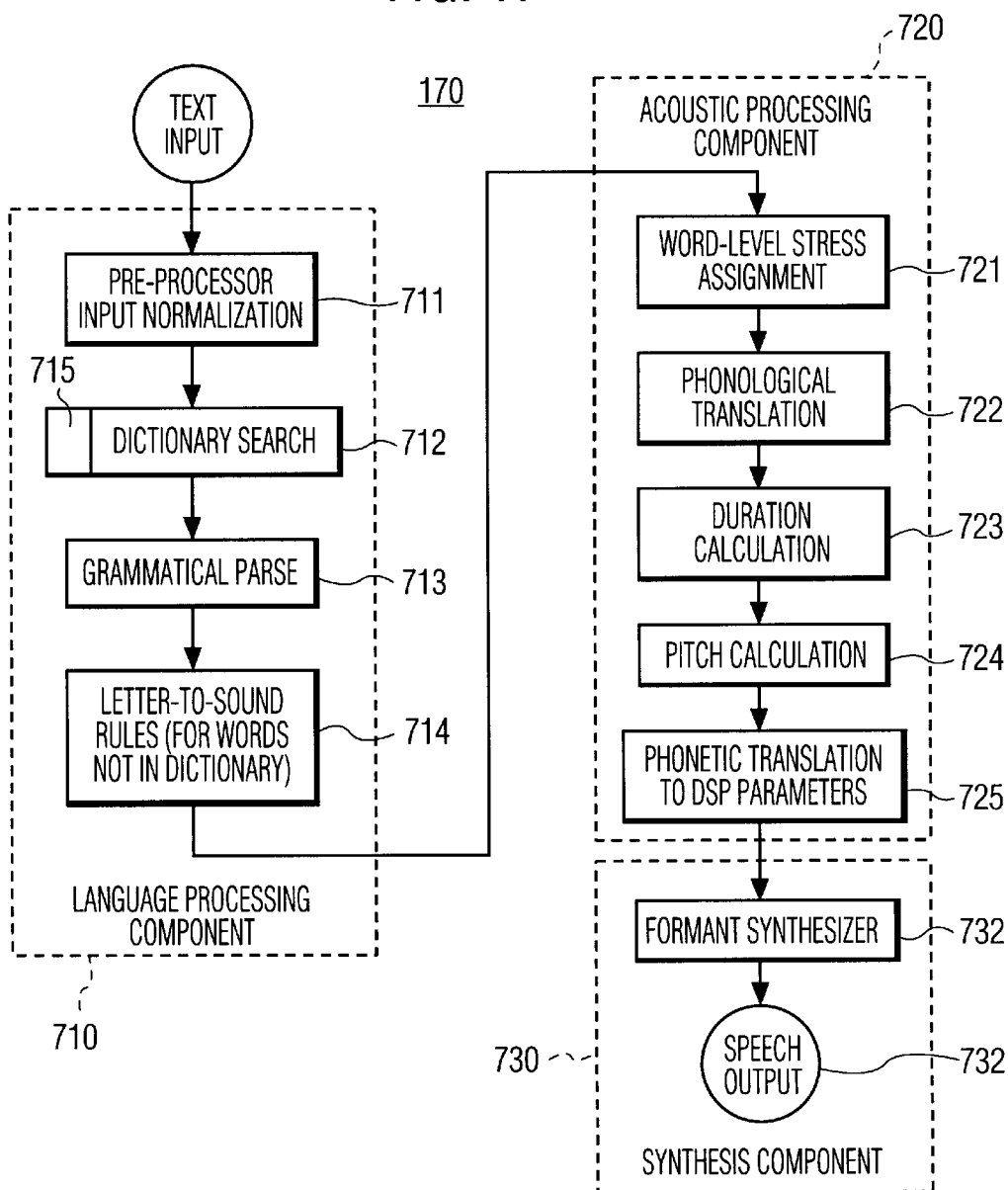
FIG. 18 is a functional block diagram of the text-to-speech converter shown in FIG. 1.

The text-to-speech converter 170 (shown in FIG. 1) is now described with reference to FIG. 18. The text to speech converter 170 has the operating specifications shown in Table 2.

TABLE 2

| | |
|---|---|
| CPU: | 25% CPU usage for a 66 MHz 486 |
| RAM: | 1.4 Mb |
| Voices: | 1 male and 1 female |
| Languages: | English |
| Sampling rate: | 8000, 96000, 11025 or 22050 Hz |
| Speech rate: | adjustable: 100–300 syllables per minute |
| Pitch reference: | adjustable: male: 70–150 Hz female: 145–300 Hz |
| Minimum pitch: | male: 50 Hz female: 100 Hz |
| Maximum pitch: | male: 200 Hz female: 350 Hz |
| Input: | unrestricted text |
| Pronunciation: | handles over 100,000 words letter-to-sound rules user entered lexicon for special applications abbreviation and acronym dictionaries |
| Prosody: | rule based intonation, duration, stress, pause |
| Text stream commands: | voice type, pitch reference, speech rate, alternate stress pattern alternate part of speech |

The text-to-speech converter 170 (shown in FIG. 1) converts unrestricted text into a synthetic speech waveform. As shown in FIG. 18, there are three major components in the text-to-speech converter: a language analysis component 710, an acoustic processing component 720 and a synthesis component 730. Each component includes several modules as illustrated in FIG. 18. The various modules in each component are processes that are executed by the microprocessor 502 shown in FIG. 5. The dictionary searched by dictionary search module 712 is a data structure that resides in memory 150.

Unrestricted text contains abbreviations, numbers, and special symbols. Thus, in pre-processing module 711 the input text is pre-processed in order to normalize the input text. For example, numerals can be converted from numeric form to word form. Common abbreviations may be expanded, i.e. Mr. to Mister. In addition to text normalization, different punctuation marks such as commas, periods, question marks, and colons are interpreted. For example, punctuation can be converted to a data element that represents a delay and an inflection change on the preceding word or words. For example, in the sentence "The President went to Wyoming ?", the pitch of the word Wyoming would be raised by pitch calculation module 724 to indicate that this phrase was a question. Additional information on the preprocessing of text prior to conversion to speech can be found in O'Malley, "Text-to-Speech Conversion Technology", Computer, Vol. 23, No. 8, August 1990, pp. 17–23, which is incorporated herein by reference.

Once the pre-processing is completed, the system extracts words from the input text character strings in dictionary search module 712. A dictionary is searched for the pronunciation and part-of-speech information of these words. To reduce memory requirements, the dictionary consists of syntactical units called morphemes, their pronunciations and parts of speech. A morpheme by itself may not actually be a word; however, when combined with certain prefixes or suffixes, it becomes a word. For example, the words "optimal", "optimize", "optimization", "optimist", and "optimism" are all derived from the morpheme "optim" in the lexicon and various suffixes. Additional information on the use of a pronunciation dictionary can be found in Sagisaka, "Speech Synthesis from Text", IEEE Communications Magazine, January 1990, pp. 35–41, which is incorporated herein by reference.

In the grammatical parse module 713, a parser uses grammatical rules to assign parts of speech to the input text and to determine phrase boundaries. This information is used in the duration calculation module 723 and the pitch calculation module 724 to produce more natural sounding prosody. In many cases, the grammatical parse module 713 can determine the intended part-of-speech of a homographic word, leading to the correct pronunciation by the synthesizer. For example, the word "contract" in the phrase "to contract" is interpreted by the parser as a verb, while in the phrase "a contract", it is interpreted as a noun. Additional information on the use of grammatical rules can be found in the above-referenced article by Sagisaka.

The input text is then sent to the morphophonemic/letter-to-sound module 714 where letter-to-sound rules provide pronunciations for those words not derived from the dictionary search module 712. In addition, the words that are derived from morphemes in the dictionary may need pronunciation and stress changes at morpheme boundaries. For example, in the work "treated", derived from "treat"+"ed", the pronunciation of the "ed" ending must be changed from /D/ to /ID/. Additional information on the use of letter-to-sound rules can be found in the above-referenced article by Sagisaka.

The dictionary module 712 is the basic source of pronunciation data. This dictionary module 712 can be augmented by the pronunciation data <Pdata> supplied by the electronic news preparer as described above with reference to Table I. As described above, when the electronic edition of the newspaper is created, words that do not fit standard pronunciation rules are marked with a pronunciation flag <P> and corresponding pronunciation data <Pdata>. When the newsreader receives a word marked with a pronunciation flag <P>, the word and its corresponding pronunciation data <Pdata> are stored in a temporary memory 715 of dictionary module 712. This allows the newsreader 100 to update the temporary memory 715 of dictionary 712 as current events change. The temporary memory 715 of dictionary module 712 is rewritten each time the newspaper is received.

The acoustic processing component 720 uses rule-based systems to (1) modify basic word pronunciation according to grammatical information and phonemic context, (2) assign durations for segments and intonation patterns for intonational phrases, and (3) convert phonemes and features to acoustic parameters. The word-level stress assignment module 721 is responsible for assigning stress to each word based on its part of speech and number of syllables. The word-level stress assignment module 721 calculates the amount of stress to be assigned to each word, using the information supplied by the language processing component 710. This stress information is then used by the duration calculation module 723, pitch calculation module 724, and phonetic translation module 725. Additional information on assigning stress or accent data to text can be found in the above-referenced article by Sagisaka.

The phonological translation module 722 is responsible for ensuring the intelligible and natural pronunciations of words. For example, the phonological translation module 722 handles the different pronunciations of "t" in "top" and "butter". Many co-articulatory rules are implemented here which affect transitions between phoneme segments and across word boundaries. Additional information on phonological translation using phonetic rules can be found in O'Malley, "Text-to-Speech Conversion Technology", Computer, Vol. 23, No. 8, August 1990, pp. 17–23, which is incorporated herein by reference.

The duration calculation module 723 computes the length of each phoneme segment based on several observations about the segment and its environment. For instance, vowel phonemes are generally longer than consonant phonemes. Also, phonemes which precede the vowel in a stressed word are longer than the same phonemes in a non-stressed word. Several similar rules are applied to each segment to calculate the final duration of each segment. Additional information on duration control can be found in the above-referenced article by Sagisaka.

The pitch calculation module 724 computes the pitch value for the beginning and middle of each phoneme based on the locations of stress and clause boundaries. For example, stressed phonemes often receive a higher pitch value than unstressed phonemes. Several rules of this type are applied to calculate the pitch values for each phoneme. Additional information on pitch control can be found in the above-referenced article by Sagisaka.

After the input text is processed by the phonological translation module 722, duration module 723, and pitch module 724, the phonetic module 725 produces a set of synthesis parameters for the text. Examples of synthesis parameters generated in phonetic module 725 can be found in the above-referenced article by Sagisaka. The parameters are then sent to the synthesis component 730 to synthesize speech sounds.

To get a more natural sound from the system, a parametric voice source may be replaced with a sampled voice source, which is extracted from natural speech via inverse filtering. A back-end formant synthesizer module 731 converts the synthesis parameters supplied by the Acoustic Processing Component to speech waveforms according to a source-tract model of speech production, where a voice source module supplies the input to a simulated vocal tract. The speech waveform is provided to speaker 180 (shown in FIG. 1) so that the user can listen to the news articles. In addition, the user can use the earphone adapter 470 (shown in FIG. 4) and a pair of earphones to listen to the news articles.

Figure 19:
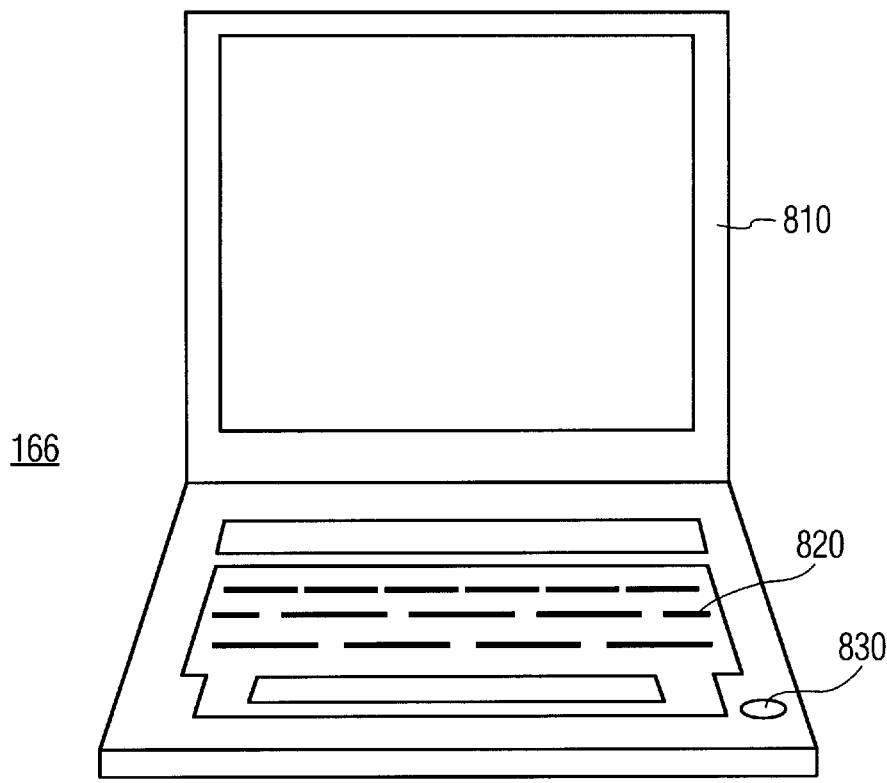
FIG. 19 is a perspective view of the components forming an advanced user interface for use with the newsreader shown in FIG. 1.

A variation on the basic user interface 160, which includes set-up controls 164 and playback controls 162, is described below. FIG. 19 is a perspective view of the an advanced user interface 166. The advanced user interface 166 includes a keyboard 820, pointer device 830 (e.g.—a mouse or track ball) and display 810. The newsreader 100 equipped with the advanced user interface 166 resembles a personal computer rather than the stand alone product shown in FIG. 4. This variation may be implemented in software on a laptop computer with a sound card and a modem.

Figure 20:
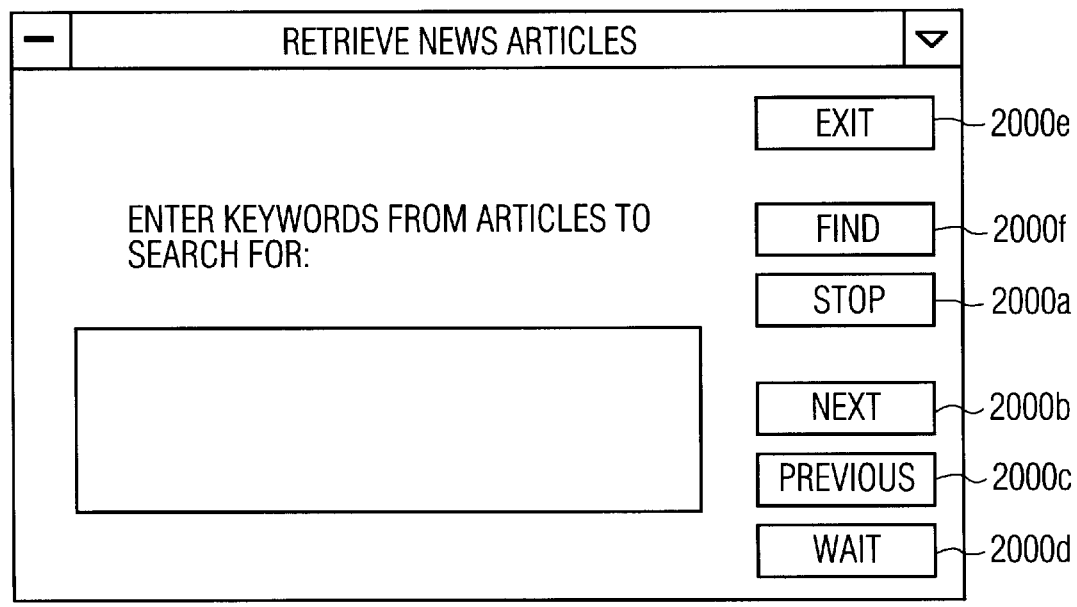
FIG. 20 illustrates an opening screen of the advanced user interface shown in FIG. 19.

The advanced user interface 166 for the newsreader 100 runs under a graphically oriented operating system such as Windows 95 or the Macintosh operating system. The advanced user interface 166 operates in a set-up mode which is similar to the set-up mode described above with respect to the basic user interface 160. Available sections of the newspaper are displayed on screen 810. Using either the keyboard 820 or the mouse 830, the user selects sections of the newspaper to be retained by section filter 140 (shown in FIG. 1). During playback, the advanced user interface 166 allows simplified user entry of queries and the audio playback of selected news articles based on the keywords they contain. FIG. 20 shows the initial screen presented to the user when the newsreader is started. The "Stop" button 2000a, "Next" button 2000b, "Previous" button 2000c, and "Wait" button 2000d are not available at start-up. The only possible choices are the "Exit" button 2000e, which terminates execution of the program, and "Find" button 2000f which initiates a query.

This variation of the newsreader 100 allows retrieval of articles based on a keyword search. Of course, one of the keywords could be the section heading name so that all the articles in one section are retrieved as described above. The advanced user interface allows the user to retrieve all articles dealing with a particular topic regardless of the section headings. For example, a user could enter "corn" and receive articles from the Food section with the latest recipes and articles from the Business section discussing commodities futures. The normal sequence for selecting articles for playback is the following.

1. Type keywords to search for in the box. If more than one keyword is typed, all articles with all the keywords in them will be returned. E.g. United States will find all articles with both United and States in them, not necessarily together.

2. Click on the Find button to start the retrieval.

3. When the results of the query are returned by the index engine (shown in FIG. 26), the headlines of each retrieved article are recited. At this time the Stop, Next, Previous, and Wait buttons are enabled. To listen to an article, press any key after hearing the headline.

4. Press Next, Previous, Wait/Continue, Stop, or Exit to control the playback. Next is enabled as long as there is at least one more article in the list of retrieved files. When pressed, either during headline or article recitation, the next headline is played back, and playback continues with headlines. Previous is enabled as long as there is at least one article prior to the current article. When pressed, either during headline or article recitation, the previous headline is played back, and playback will continue with headlines (in a forward direction). If pressed during the playback of the body of an article, Next and Previous terminate the playback of the article and go to the appropriate headline. Wait is enabled as long as playback is happening (either headline or article). Pressing Wait causes the playback to be paused. No playback will occur until the button is pressed again. When pressed, the button label changes to Continue to indicate that the button needs to be selected again to continue playback. Stop terminates article playback and returns the newsreader 100 to its initial state, awaiting entry of keywords. Exit terminates the newsreader program.

Figure 21:
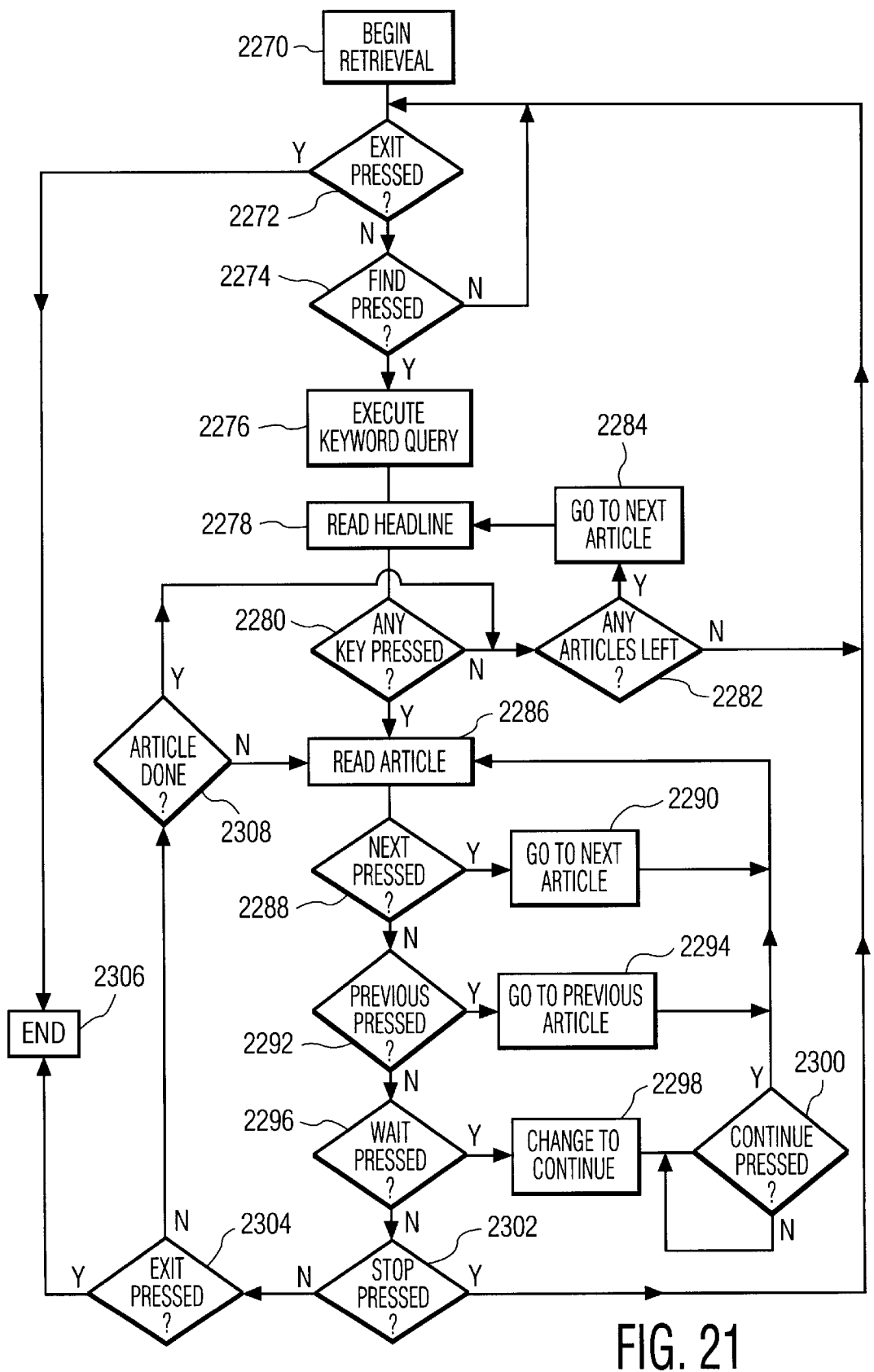
FIG. 21 is a flowchart of article retrieval based on keywords.

FIG. 21 is a flow chart illustrating the operation of the advanced user interface 166. The keyword retrieval mode is entered at step 2270. If the user presses the Exit button, the process flows to step 2306 which ends the retrieval mode. If Find is pressed at step 2274, flow proceeds to step 2276 where the keyword query is executed. At step 2278, the headlines of the articles retrieved at step 2276 are read consecutively.

If no buttons are pressed at step 2280, the process loops through steps 2282 and 2284, reading the headlines of the retrieved articles until there are no more articles, at which point, the process flows back to step 2272. If any key is pressed at step 2280, the newsreader begins reading the corresponding article at step 2286. Pressing the Next button causes the next article to be read through steps 2288 and 2290. Pressing the Previous button causes the previous article to be read through steps 2292 and 2294. If Wait is pressed at step 2296, the legend Wait changes to Continue at step 2298. Step 2300 loops until Continue is pressed at which point reading of the current article resumes at step 2286. If Stop is pressed at step 2302, the process flows to step 2272 where the user can exit the program or enter a new query. If Exit is pressed at step 2304, the process flows to step 2306 where the retrieval program is ended.

If none of the buttons in steps 2288, 2292, 2296, 2302 or 2304 is pressed, the process flows to step 2308. If the current article is complete, it is determined if any articles remain at step 2282. Headline reading continues with any remaining articles at step 2278. If the article is not finished, then the newsreader continues to read the article at step 2286.

Figure 22:
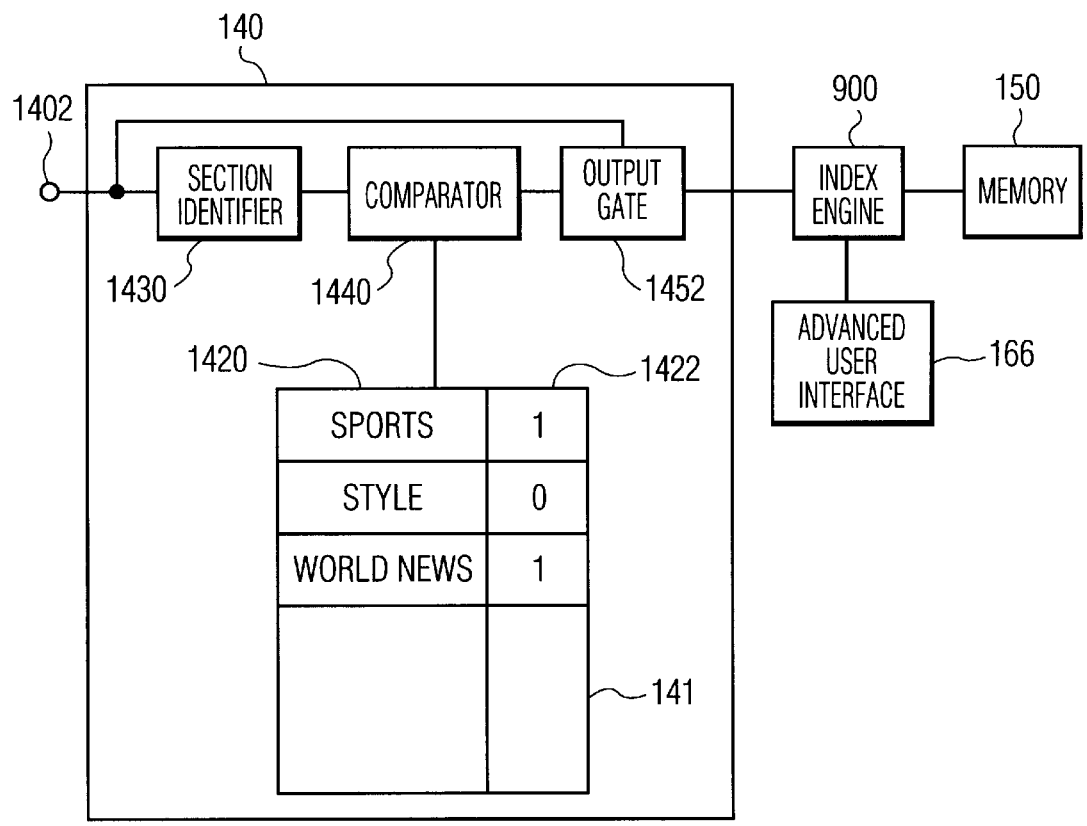
FIG. 22 is a functional block diagram of a portion of the newsreader including an advanced user interface.

To provide for keyword searching, the newsreader 100 equipped with the advanced user interface 166 also includes an index engine 900 as shown in FIG. 22. Section filter 140 is the same as that shown in FIG. 11. The linked list generator 145 (shown in FIG. 11) is replaced with an index engine 900. The index engine 900 stores the articles in memory 150 so that keyword retrieval is possible. Each article is stored as a file. A keyword index, based on the words appearing in the articles, is established by the index engine 900. The advanced user interface 166 accesses the articles in memory 150 through the index engine 900.

Figure 23:
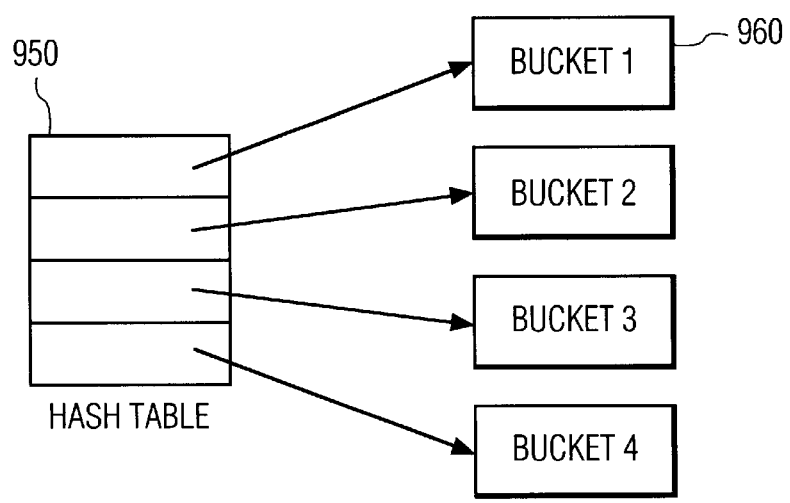
FIG. 23 illustrates how the articles are stored in the memory to provide for keyword retrieval.

FIG. 23 illustrates how the news articles, stored in the memory 150, may be indexed by the index exemplary engine 900. Index engine 900 maintains a hash table 950 that has as entries keywords derived from each news article. Each entry of the hash table points to a bucket 960. The bucket 960 includes a list of article entries, each entry contains a pointer to the article and position information within the article for the keyword.

Figure 24:
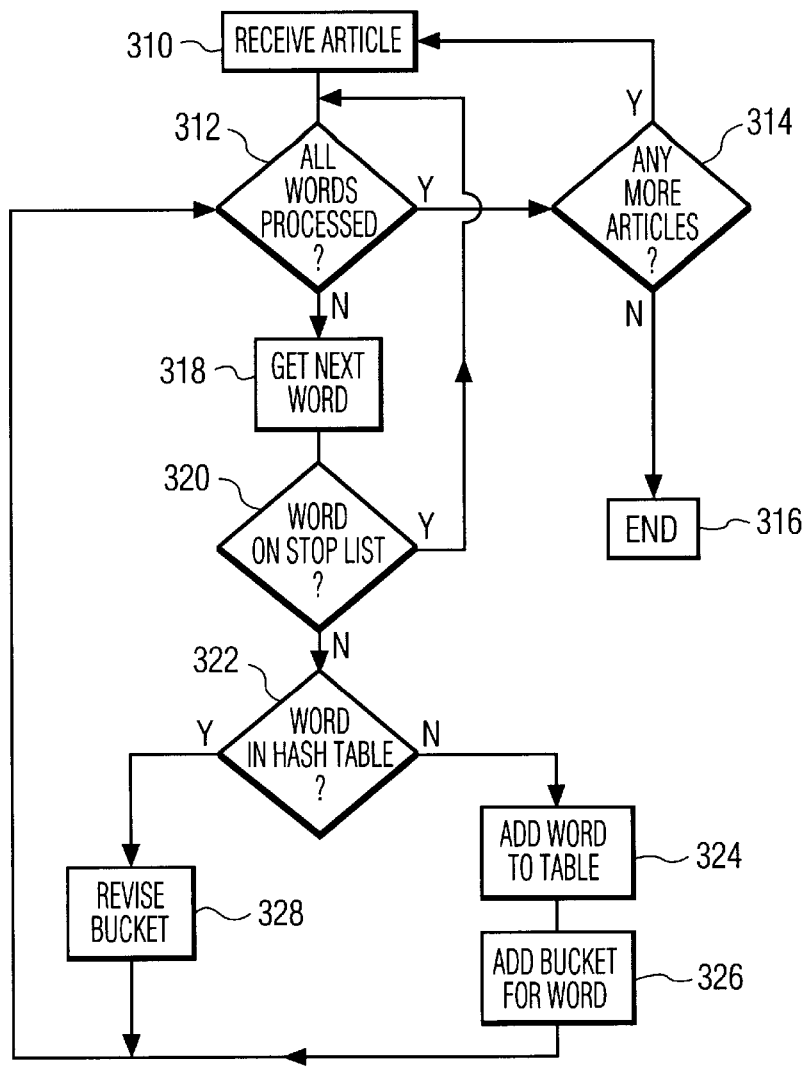
FIG. 24 is a flowchart of the process for storing articles in the format shown in FIG. 23.

FIG. 24 is a flowchart of the process of inserting news articles into the index as performed by index engine 900. The article is received by the index engine 900 at step 310. Step 312 determines if all of the words in the articles have been processed. If so, step 314 determines whether any more articles are being provided by the section filter 140 (shown in FIG. 23). If all articles have been processed, the index engine stops processing at step 316. At step 312, if all the words in the article have not been processed, the next word is extracted at step 318. Step 320 determines if the retrieved word is on the stop list. The exemplary stop list is user modifiable and contains common words that are not useful to index e.g. "a", "and", and "the". If so, there is no need to index this word and flows proceeds to step 312. If not, the process goes to step 322 where it is determined if the word is already in the hash table 950 (shown in FIG. 23). If the word is in the hash table 950, the bucket 960 (shown in FIG. 23) associated with the word is updated to include the document and position information for the current word. It is contemplated that the position information can be used for retrieval based on proximity to other words. If the word is not already in the hash table 950, the word is added to the hash table 950 and bucket information associated with the word is added to the index.

Figure 26:
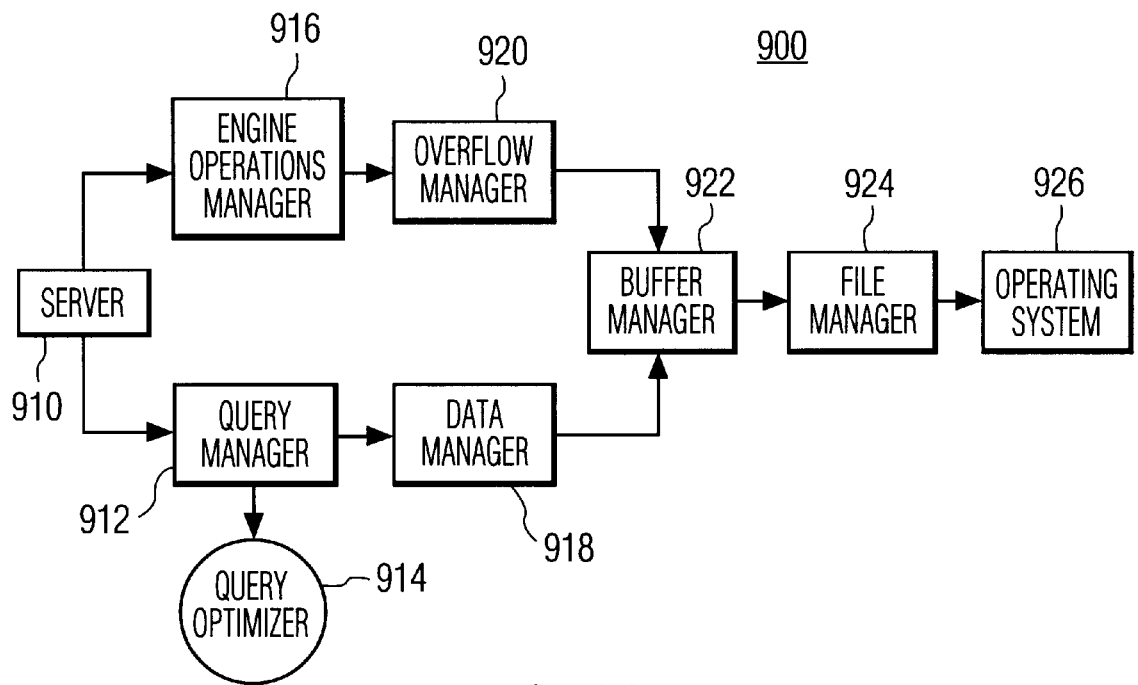
FIG. 26 is a functional block diagram of an index engine which stores and retrieves articles based on keywords.

When a set of keywords is entered in the "keyword box", a query is constructed that is understood by an index engine (shown in FIG. 26). That query, a retrieve command together with a logical operation of the keywords, is transmitted using MS Windows DDE (Dynamic Data Exchange) to the index engine, which is running as a separate process. The front end program then waits for the answer.

Figure 25:
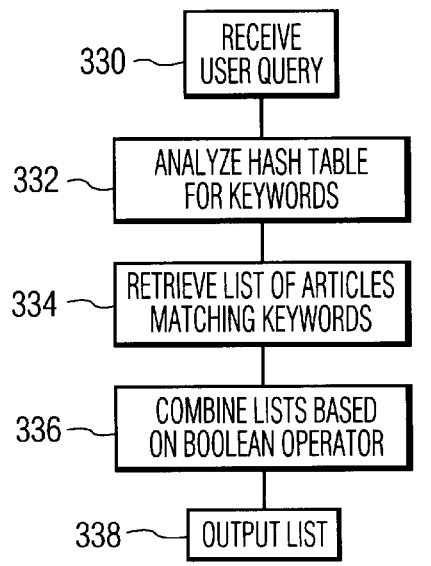
FIG. 25 is a flowchart of article retrieval based on keywords.

FIG. 25 is a flowchart of the process of retrieving articles as implemented by index engine 900. The keyword query entered by the user on the advanced user interface 166 (shown in FIG. 22) is received by the index engine 900 (shown in FIG. 22) at step 330. At step 332, the hash table 950 (shown in FIG. 23) is analyzed to determined which entries of the hash table match the user entered keywords. The list of articles corresponding to the keywords entered by the user are retrieved, using the bucket information 960 (shown in FIG. 23) at step 334. These lists are combined at step 336 using Boolean algebra if the user query includes statements such as "AND", "OR", "NOT", etc. The combined list is forwarded to the user interface 166 at step 338.

The results from the index engine consist of a list of file names, each of which matches the keyword set in the query. The advanced user interface 166 (shown in FIG. 22) then reads each file in turn searching for its headline by locating the headline marker as shown in Table I. This headline string is in turn passed to the speech synthesizer utilizing the included application interface (API) where interprocess communications with the text-to-speech converter 170 take place. The process of reading of files, searching for the headline, passing the string to the synthesizer, and waiting to see if the user presses a key continues until the list of files is completed, at which time the newsreader returns to its initial state waiting for a query, or for a key to be pressed.

Alternatively, as described above, a DMA controller may be used to transfer the entire article to the text-to-speech processor and any change in status of the user controls may be handled using the application interface (API).

FIG. 26 is a functional block diagram of the exemplary index engine 900 which maintains a text-index of all the keywords in the news articles. The blocks forming the index engine 900 are processes that are implemented by microprocessor 502 shown in FIG. 5. The index is constructed to efficiently evaluate content-based user queries. The index engine 900 operates as a separate server process communicating with its clients using, for example, MS Windows DDE (Dynamic Data Exchange) for interprocess communications. The index engine 900 uses its own buffer space to reduce disk access, utilizing linked lists of available blocks, in use blocks, and in use blocks that contain modified data.

The architecture of the index engine 900 is illustrated in FIG. 26. The server 910 waits for requests from the advanced user interface 166 on a MS Windows DDE (Dynamic Data Exchange) connection. The server 910 forwards the request for the execution of a query (the retrieve operation) to the query manager 912. The query manager 912, in turn, submits the query to the query optimizer 914, which returns an optimal plan for the evaluation of the query. The server 910 forwards requests for the execution of operations other than the retrieve operation to the engine operations manager 916. To execute the engine operations, the engine operation manager 916 accesses records stored in inverted lists. Similarly, the engine operation manager 916 may insert, delete, or modify a record in an inverted list.

The access to the records on the inverted lists is controlled by the data structure manager 918. The engine operation manager 916 and the query manager 912 access the inverted lists in a record-oriented fashion. The inverted lists, however, actually reside in files on the disk to which the underlying operating system does not provide an interface for record-oriented access. The data structure manager 918 is responsible for providing record-oriented access to the data structures maintained by the index engine 900 which are stored in files in low capacity memory 150.

As mentioned previously, to improve the response time of the insertion operations, the index engine 900 does not insert the records for the articles into the inverted lists on the disk directly. Instead, the records are first inserted into certain main memory resident data structures referred to as the overflow lists. The access to the overflow lists (that is, insert, delete, modify, and retrieve operations) is controlled by the overflow manager 920. The overflow manager 920 interacts with the main memory resident data structures (viz. overflow lists) in the same manner that the data structure manager 918 interacts with the disk resident data structures.

In addition, the buffer manager 922 maintains several main memory buffers into which it brings the blocks containing the index engine data as they are requested. Even though the files (in which the index engine data structures are stored) are buffered by the operating system 926, the buffer manager 922 is used for the following reasons. First, maintaining buffers in the index engine 900 allows the index engine 900 to exploit the locality of the data it accesses. Thus, the index engine 900 is not affected by the disk access of other concurrently executing processes such as file manager 924. Second, the pool of buffers is used not only for buffering the file blocks containing the engine data, but also as a reservoir of main memory. If the index engine 900 needs main memory (e.g. to implement the overflow lists), instead of dynamically acquiring the main memory from the operating system 926, it takes the buffers from the buffer manager 922. This is done because dynamic allocation and deallocation of the shared memory from the operating system 926 may be time-consuming. Furthermore, this implementation limits the amount of main memory used by the index engine 900 at the time of the invocation which enhances applicability of the index engine 900 over different hardware platforms.

If the newsreader 100 is equipped with the advanced user interface 166 described above, it may be used to control the various parameters of the text-to-speech converter 170. In the stand alone product shown in FIG. 4, these parameters are set by the manufacturer. Because the advanced user interface 166 discussed above allows a wider variety of user inputs, the following text-to-speech converter 170 parameters can be altered by the user.

Voice Type

The user may select between the male voice and the female voice by using a simple toggle command. Both voices in the default setting have a slightly low overall pitch which is designed to minimize the user's fatigue in listening to long text passages. This voice characteristic is desirable for reading and proofreading long text passages.

Voice Pitch

Once a voice type is selected, the user can make fine adjustments in pitch by raising or lowering the overall pitch for that voice.

Speech Rate

The text-to-speech converter 170 has an average default speech rate is 170 words per minute. The user can select an average speech rate from 120 to 240 words per minute.

User-defined Dictionary

A program is provided which accepts new words and pronunciations from the user and automatically sends commands to the synthesizer to add the words to the dictionary 712. This is useful for words that do not appear in the dictionary 712 and do not follow letter-to-sound rules that are stored in letter-to-sound rules module 714 shown in FIG. 18.

The electronic news preparer may override the stress pattern assignments of the text-to-speech converter 170. This enables the electronic news preparer to alter the intonation of sentences by emphasizing unstressed words or de-emphasizing stressed words. The electronic news preparer may also override the default part-of-speech assignment. This allows the electronic news preparer to alter, if necessary, the pronunciation of a homographic word (e.g., "to contract" vs. "a contract") by specifying the part of speech of the word ("contract").

Figure 27:
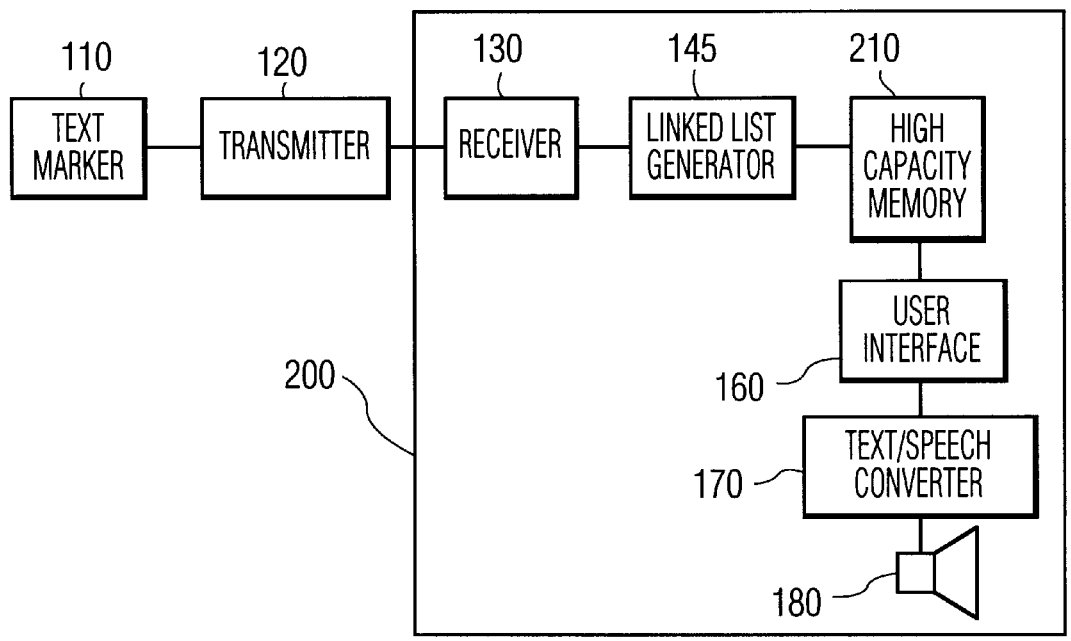
FIG. 27 is a functional block diagram of a variation of the news delivery system shown in FIG. 1.

A first variation of the newsreader 100 is shown in FIG. 27. FIG. 27 differs from FIG. 1 in that the section filter 140 (shown in FIG. 1) is removed and the low capacity memory 150 (shown in FIG. 1) is replaced with a high capacity memory 210. High capacity memory 210 may include, for example, a mini-hard disk. In this embodiment, the entire electronic edition of the newspaper is stored in high capacity memory 210. The filtering of the news articles to be read is only performed during playback. Using either the basic user interface or the advanced user interface, the user can retrieve news articles for audible output.

Figure 28:
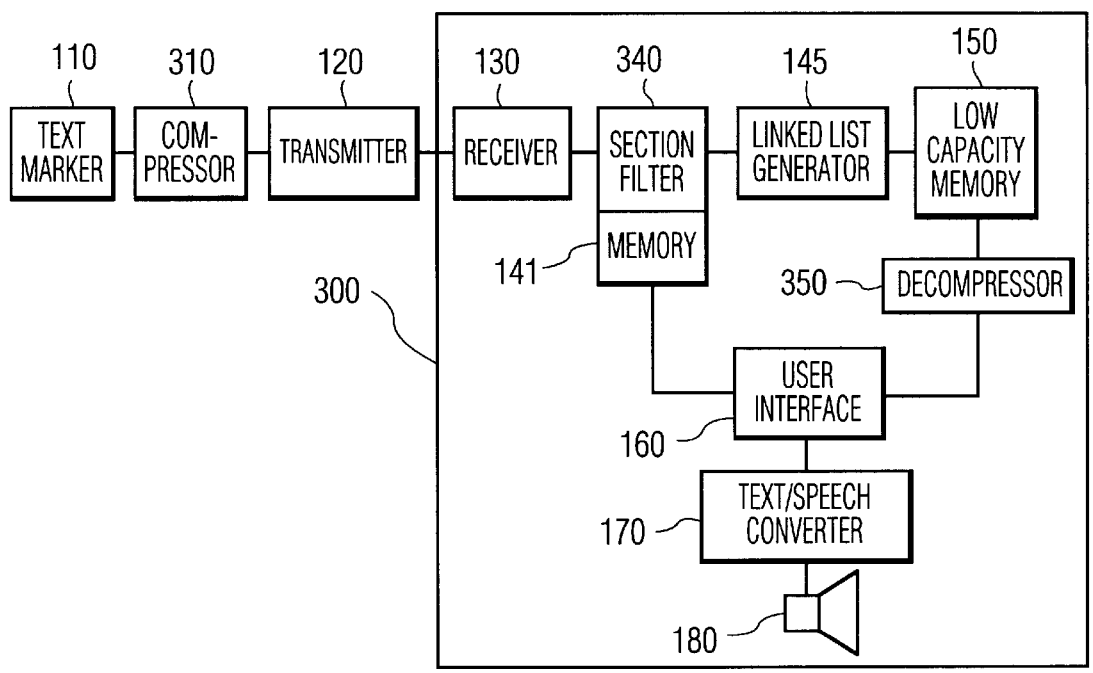
FIG. 28 is a functional block diagram of a variation of the news delivery system shown in FIG. 1.

A second variation of the newsreader 100 is shown in FIG. 28. FIG. 28 differs from FIG. 1 in that a compressor 310 is provided before transmitter 120 and a decompressor 350 is provided between the low capacity memory 150 and the user interface 160 in the newsreader 300. The compressor 310 reduces the size of the electronic version of the newspaper by using any conventional text compression algorithm (e.g. VH2xbis). The advantages of compressing the electronic version of the newspaper are twofold. First, the time required to transmit the electronic version of the newspaper is reduced. This allows the transmitter to accomplish multiple transmissions in the event an initial transmission is corrupted. Second, the compressor 310 allows more information to be placed in the low capacity memory 150. Using the low capacity memory 150 reduces the size and expense of the newsreader 300 compared to the newsreader having high capacity memory 210 as shown in FIG. 27. The decompressor 350 returns the electronic version of the newspaper to its original state so that the user interface 160 can properly process the text.

The section filter 340 has the ability to sort the compressed electronic version of the newspaper based on sections. To do this, the compressor 310 does not compress the section headings that have been marked by text marker 110. Thus, the input to the exemplary section filter 340 includes uncompressed section headings and compressed news articles. The section filter 340 retains or discards news articles based on the uncompressed section headings as described in the embodiment shown in FIG. 1. The compressed news articles are stored on the low capacity memory 150.

An alternative to the conventional text compression techniques may be implemented as follows. If a word appears in the dictionary search module 712 (shown in FIG. 18), it is transmitted from the electronic news preparer as its address in the dictionary search module 712. The address accesses the correct pronunciation data stored in the dictionary search module 712 without having to perform a search of the dictionary for a match. Words that are not in the dictionary but follow the letter-to-sound rules used in letter to sound rule module 714 are compressed conventionally. Words that are not currently in the dictionary search module 712 and do not follow the letter-to-sound rules are tagged with the <P> flag and <Pdata>, as described above, and compressed conventionally.

Figure 29:
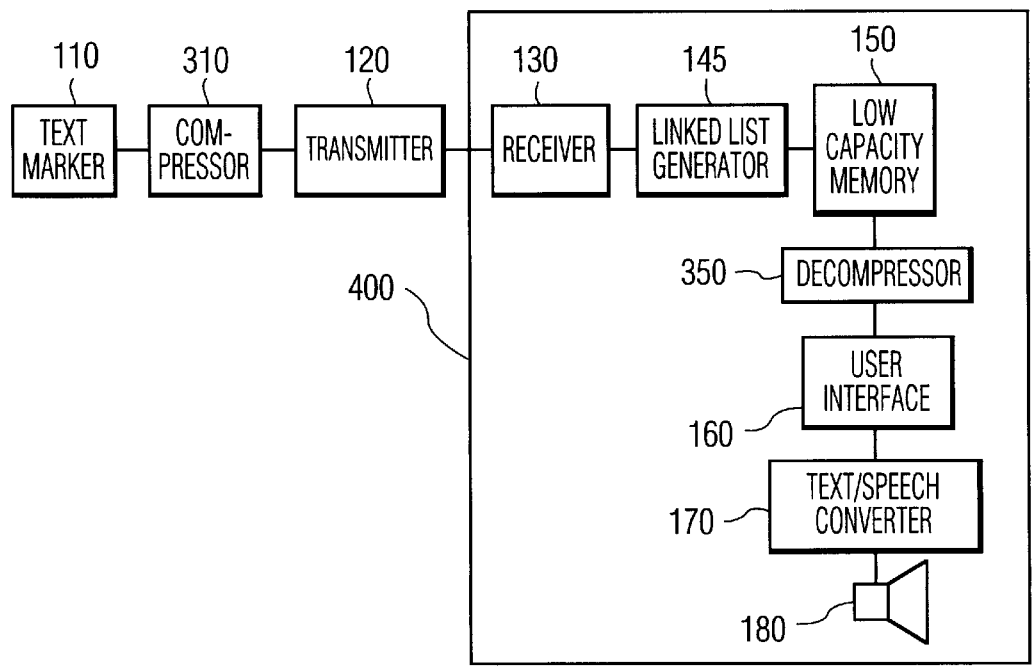
FIG. 29 is a functional block diagram of a variation of the news delivery system shown in FIG. 1.

A third variation of the newsreader 100 is shown in FIG. 29. FIG. 29 differs from FIG. 1 in that compressor 310 and decompressor 350 are included in the newsreader 400. The section filter 140 is also removed which allows the entire compressed electronic edition of the newspaper to be stored in the low capacity memory 150. Decompressor 350 returns the news articles to an uncompressed form so that the electronic edition of the newspaper can be processed by the user interface 160. Using either the basic user interface or the advanced user interface, the user can retrieve news articles for audible output. It is understood that the linked list generator 145 shown in FIGS. 27–29 may be replaced with the index engine 900 as shown in FIG. 22 to provide for keyword searching.

The invention allows for delivery of an electronic edition of the newspaper to a subscriber in the evening and for audible playback of the newspaper the next day while the user is commuting to work or performing other tasks. By using either a basic or advanced user interface, the user can retain the news articles that are of interest and discard unwanted material. Listening to the newspaper while commuting or performing other tasks results in an efficient use of the user's limited time.

While the invention has been described with reference to exemplary embodiments, it is not limited thereto. Rather, the appended claims should be construed to include other variants and embodiments of the invention which may be made by those skilled in the art without departing from the scope of the present invention.

What is claimed:

1. A news receiving apparatus for receiving an electronic edition of a newspaper, the apparatus comprising:

receiving means for receiving the electronic edition of the newspaper including text data of news articles;

section filtering means for retaining or discarding the text data corresponding to specified sections of the electronic edition of the newspaper;

memory means for storing the text data corresponding to the retained sections of the electronic edition of the newspaper;

text-to-speech conversion means for converting portions of the stored text data into a spoken representation of words represented by the portions of the stored text data; and user interface means including:

means for establishing which sections of the electronic edition of the newspaper are retained by said section filtering means and for controlling which portions of the electronic edition of the newspaper are provided to said text-to-speech conversion means;

input means for receiving at least one keyword entered by a user, and search means for retrieving the news articles that contain the at least one keyword.

2. A news receiving apparatus of claim 1, wherein said search means comprises an index engine.

3. A news receiving apparatus of claim 1, wherein said memory means only stores at least X bytes, where X is an integer and $$X = Y \cdot ((M/N) \cdot 60) \cdot P$$

wherein said memory means only stores written text to be converted to about Y hours of corresponding speech where the written text is not compressed; and wherein the audible output signal representing the spoken words has a speech rate of M syllables per minute with an average of N syllables for each of the words, and an average of P letters for each of the words.

4. A news receiving apparatus of claim 3, wherein:
Y=two;
M=three hundred;
N=two; and
P=seven.

5. A news receiving apparatus of claim 1, wherein the news receiving apparatus is implemented in a portable computer.

6. A news receiving apparatus of claim 1, wherein the news receiving apparatus is a stand alone product.

7. A news receiving apparatus of claim 1, wherein the receiving means includes telephone interface means for receiving the electronic edition of the newspaper from a telephone line.

8. A news receiving apparatus of claim 1, wherein the receiving means includes cable interface means for receiving the electronic edition of the newspaper from a cable television system.

9. A news receiving apparatus of claim 8, wherein the receiving means includes means for receiving the electronic edition of the newspaper on an entire cable channel.

10. A news receiving apparatus of claim 8, wherein the receiving means includes means for receiving the electronic edition of the newspaper during the vertical blanking interval of a television signal.

11. A news receiving apparatus of claim 1, wherein the receiving means includes interface means for receiving the electronic edition of the newspaper from a subcarrier modulated signal.

12. A news receiving apparatus of claim 1, wherein the receiving means includes satellite interface means for receiving the electronic edition of the newspaper through satellite communications.

13. An electronic news receiving apparatus of claim 1, further comprises speech recognition means for receiving and recognizing speech commands to control the operation of the electronic news receiving apparatus.

14. A news receiving apparatus of claim 1, wherein the text-to-speech conversion means includes:

letter to sound conversion means for providing pronunciation data for words in the electronic edition of the newspaper based on the letter to sound rules; and a dictionary which stores pronunciation data for words that do not comply with the letter to sound rules.

15. An electronic news receiving apparatus of claim 14, wherein the electronic edition of the newspaper is compressed and predetermined words in the electronic edition of the newspaper that correspond to words stored in said dictionary means are compressed using a dictionary address corresponding to each of the predetermined words and wherein the dictionary means includes means for decompressing each of the predetermined words in response to the dictionary address.

16. An electronic news receiving apparatus of claim 14, wherein words in the electronic edition of the newspaper that do not comply with pronunciation rules are assigned a pronunciation flag and pronunciation data and are transmitted with the text data, and the words which are assigned the pronunciation flag and the corresponding pronunciation data are stored in a temporary area of the dictionary means as the electronic edition of the newspaper is received.

17. An electronic news receiving apparatus of claim 14, further comprises acoustic processing means for modifying the pronunciation data according to grammatical data and phonemic context.

18. An electronic news receiving apparatus of claim 14, wherein the stored electronic edition of the newspaper includes intonational phrases and the electronic news receiving apparatus further comprises acoustic processing means for assigning intonation patterns to the intonational phrases.

19. An electronic news receiving apparatus of claim 14, wherein the stored electronic edition of the newspaper includes phoneme segments and the electronic news receiving apparatus further comprises acoustic processing means for converting the phoneme segments to acoustic parameters.

20. An electronic news receiving apparatus of claim 14, wherein the stored electronic edition of the newspaper includes phoneme segments and the electronic news receiving apparatus further comprises acoustic processing means for assigning durations for the phoneme segments.

21. An electronic news receiving apparatus of claim 14, further comprises acoustic processing means for assigning stress data to the words in the electronic edition of the newspaper.

22. A method for receiving and audibly reproducing an electronic edition of a newspaper, the method comprising the steps of:

receiving, as text data, the electronic edition of the newspaper at a receiver;

retaining or discarding portions of the received text data corresponding to news articles in specified sections of the electronic edition of the newspaper;

storing the received text data corresponding to the retained sections of the electronic edition of the newspaper in a memory;

converting portions of the stored text data into a spoken representation of words represented by the stored text data;

processing user commands to determine which sections of the electronic edition of the newspaper are specified to be stored in said memory and which portions of the electronic edition of the newspaper are specified to be converted to said spoken representation;

receiving at least one keyword entered by a user; and searching the news articles in said memory to identify the articles that contain the at least one keyword and to retrieve the identified articles to be converted into the spoken representation.

23. A method for receiving and audibly reproducing an electronic edition of a newspaper as recited by claim 22, further comprising the step of:

receiving the electronic edition of the newspaper from a telephone interface.

24. A method for receiving and audibly reproducing an electronic edition of a newspaper as recited by claim 22, further comprising the step of:
receiving the electronic edition of the newspaper via a cable television interface.

25. A method for receiving and audibly reproducing an electronic edition of a newspaper as recited by claim 24, wherein the electronic edition of the newspaper is received via the cable television interface from an entire cable channel.

26. A method for receiving and audibly reproducing an electronic edition of a newspaper as recited by claim 24, wherein the electronic edition of the newspaper is received via the cable television interface during the vertical blanking interval of a television signal.

27. A method for receiving and audibly reproducing an electronic edition of a newspaper as recited by claim 22, further comprising the step of receiving the electronic edition of the newspaper via a subcarrier modulation interface.

28. A method for receiving and audibly reproducing an electronic edition of a newspaper as recited by claim 22, further comprising the step of receiving the electronic edition of the newspaper via a satellite communications interface.

29. A method for receiving and audibly reproducing an electronic edition of a newspaper as recited by claim 22, wherein the step of converting the electronic edition of the newspaper to an audible output signal further comprises the steps of:
providing pronunciation data for words in the electronic edition of the newspaper based on dictionary and letter to sound rules.

30. A method for receiving and audibly reproducing an electronic edition of a newspaper as recited by claim 29, wherein the electronic edition of the newspaper is compressed and the method further includes the set of:
decompressing predetermined words in the electronic edition of the newspaper that correspond to the stored pronunciation data by converting a received dictionary address corresponding to each of the predetermined words.

31. A method for receiving and audibly reproducing an electronic edition of a newspaper as recited by claim 29, wherein words in the electronic edition of the newspaper that do not comply with the dictionary and letter to sound rules have a pronunciation flag and pronunciation data transmitted with the electronic edition of the newspaper and wherein the method further comprises the step of storing the words assigned the pronunciation flag and the corresponding pronunciation data in a temporary memory.

32. A system for providing an electronic edition of the newspaper to an electronic news receiving apparatus, said system comprising:
means for generating an electronic edition of a newspaper;
means for marking the electronic edition of the newspaper by inserting markers into the electronic edition of the newspaper;
means for transmitting the electronic edition of the newspaper to the electronic news receiving apparatus;
the electronic news receiving apparatus including;
means for receiving data representing the transmitted, marked electronic edition of the newspaper;
means for retaining and discarding portions of the received data corresponding to sections of the electronic edition of the newspaper based on the marks inserted into the electronic edition of the newspaper;
means for storing the received data representing the retained sections of the electronic edition of the newspaper;
means for generating a spoken representation of words represented by the stored data;
means for receiving at least one keyword entered by a user; and
means for searching the news articles in said memory to identify the articles that contain the at least one keyword and retrieving the identified articles to be converted into the spoken representation.

\* \* \* \* \*